United States Patent
Lumbatis et al.

(10) Patent No.: US 12,317,169 B2
(45) Date of Patent: *May 27, 2025

(54) PROTECTED PRE-ASSOCIATION STATION IDENTIFICATION

(71) Applicant: Ruckus IP Holdings LLC, Claremont, NC (US)

(72) Inventors: Kurt A Lumbatis, Dacula, GA (US); Mark Hamilton, Superior, CO (US)

(73) Assignee: Ruckus IP Holdings LLC, Clarement (NC)

( * ) Notice: Subject to any disclaimer, the term of this patent is extended or adjusted under 35 U.S.C. 154(b) by 697 days.

This patent is subject to a terminal disclaimer.

(21) Appl. No.: 17/538,463

(22) Filed: Nov. 30, 2021

(65) Prior Publication Data

US 2022/0086736 A1    Mar. 17, 2022

Related U.S. Application Data

(63) Continuation-in-part of application No. 17/406,757, filed on Aug. 19, 2021, now Pat. No. 12,047,867, and (Continued)

(51) Int. Cl.
*H04W 4/00* (2018.01)
*H04W 8/26* (2009.01)
(Continued)

(52) U.S. Cl.
CPC ............. *H04W 48/08* (2013.01); *H04W 8/26* (2013.01); *H04W 48/16* (2013.01); *H04W 76/11* (2018.02); *H04W 84/12* (2013.01)

(58) Field of Classification Search
CPC ....... H04W 48/08; H04W 48/16; H04W 8/26; H04W 76/11; H04W 84/12
(Continued)

(56) References Cited

U.S. PATENT DOCUMENTS

| 9,942,010 B1 | 4/2018 | Chu et al. |
| 10,028,179 B2 | 7/2018 | Cherian |

(Continued)

FOREIGN PATENT DOCUMENTS

| EP | 3 965 363 | 3/2022 |
| WO | 2020/010126 | 1/2020 |
| WO | 2021/021956 | 2/2021 |

OTHER PUBLICATIONS

International Preliminary Report on Patentability issued May 2, 2024, in International (PCT) Application No. PCT/US2022/050349.
(Continued)

*Primary Examiner* — Temica M Beamer
(74) *Attorney, Agent, or Firm* — Chernoff, Vilhauer, McClung & Stenzel, LLP

(57) ABSTRACT

Methods, systems, and computer readable media can be operable to facilitate an exchange of messages between an access point and a station, wherein the access point requests a unique identifier from the station. The station initiates a secure connection with the access point prior to associating with the access point. The station may either respond with a message declining to provide a unique identifier or respond with a message including a unique identifier to be used by the access point for the station via the secure connection. The response from the station may include additional limitations on the use of the unique identifier by the access point. The access point may enforce different policies against the station depending upon how the station responds to the unique identifier request. A station can provide a user interface for the configuration of the unique identifier based on one or more configuration parameters.

20 Claims, 16 Drawing Sheets

Related U.S. Application Data a continuation-in-part of application No. 17/406,692, filed on Aug. 19, 2021, now Pat. No. 12,047,866, and a continuation-in-part of application No. 17/514,232, filed on Oct. 29, 2021, now Pat. No. 12,137,345, said application No. 17/406,757 is a continuation of application No. 16/743,623, filed on Jan. 15, 2020, now Pat. No. 11,109,302, said application No. 17/406,692 is a continuation of application No. 16/743,623, filed on Jan. 15, 2020, now Pat. No. 11,109,302, said application No. 17/514,232 is a continuation of application No. 16/743,623, filed on Jan. 15, 2020, now Pat. No. 11,109,302.

(60) Provisional application No. 62/875,279, filed on Jul. 17, 2019, provisional application No. 62/792,744, filed on Jan. 15, 2019.

(51) Int. Cl.
*H04W 48/08* (2009.01)
*H04W 48/16* (2009.01)
*H04W 76/11* (2018.01)
*H04W 84/12* (2009.01)

(58) Field of Classification Search
USPC .......................................................... 370/338
See application file for complete search history.

(56) References Cited

U.S. PATENT DOCUMENTS

| | | |
|---|---|---|
| 2009/0092085 A1 | 4/2009 | Ramesh et al. |
| 2012/0099574 A1 | 4/2012 | Tamura |
| 2013/0237216 A1 | 9/2013 | Ong |
| 2016/0135041 A1 | 5/2016 | Lee et al. |
| 2016/0135053 A1 | 5/2016 | Lee et al. |
| 2016/0269359 A1 | 9/2016 | Adrangi et al. |
| 2016/0381070 A1 | 12/2016 | Zhang et al. |
| 2017/0118602 A1 | 4/2017 | Seok et al. |
| 2017/0171737 A1 | 6/2017 | Mestanov et al. |
| 2019/0387459 A1 | 12/2019 | McCann et al. |
| 2020/0097675 A1 | 3/2020 | Levin |
| 2020/0229071 A1 | 7/2020 | Ansley et al. |
| 2021/0385728 A1 | 12/2021 | Hamilton |
| 2022/0053334 A1 | 2/2022 | Lumbatis et al. |
| 2022/0086736 A1 | 3/2022 | Lombatis et al. |

OTHER PUBLICATIONS

International Preliminary Report on Patentability issued May 2, 2024, in International (PCT) Application No. PCT/US2022/050346.
International Search Report and Written Opinion issued Aug. 24, 2023 in International Application No. PCT/US2023/020347.
Lambatis et al., "Private Identifier Requirements for TGbh," Wireless LANs, IEEE 802.11-21/1634r2, Jan. 2022, 4 pages.
Hamilton et al., "Proposed Text for ID Query Action Frame," Wireless LANs, IEEE P802.11, 11-21/1379r3, Oct. 2021, 8 pages.
802.11 Working Group of the 802 Committee, "Draft Standard for Information Technology—Telecommunications and information exchange between systems—Local and metropolitan area networks—Specific requirements," Part II: Wireless LAN Medium Access Control(MAC) and Physical Layer (PHY) specifications, IEEE P802.11u™/D8.03, Mar. 2010, 204 pages.
International Search Report and the Written Opinion of the International Searching Authority dated Dec. 15, 2022 in International (PCT) Application No. PCT/US2022/046987.
Carol Ansley (Arris) "ID_Query_Proposal", IEEE Draft; 11-19-0496-01-000M-ID-QUERY Proposal, IEEE-SA Mentor, Piscataway, NJ USA vol. 802.11m, No. 1, Jul. 17, 2019 (Jul. 17, 2019), pp. 1-4, XP068153159.
Carol Ansley (Arris) "IDQuery Query Message Proposal", IEEE Draft; 11-19-0179-01-0ARC-IDQUERY-Query-Message-Proposal, IEEE-SA Mentor, Piscataway, NJ USA, vol. 802.11 ARC, No. 1, Mar. 14, 2019 (Mar. 14, 2019), pp. 1-8, XP068148268.
Office Action date Jan. 25, 2023 in Indian Application No. 202127031804 with English translation.
International Search Report issued Apr. 16, 2020 in International (PCT) Application No. PCT/US2020/013688.
International Preliminary Report on Patentability dated Jun. 16, 2021 in International (PCT) Application No. PCT/US2020/013688.
International Preliminary Report on Patentability issued Apr. 30, 2024 in corresponding International (PCT) Patent Application No. PCT/US2022/046987.
International Preliminary Report on Patentability dated Jun. 20, 2024 in International (PCT) Application No. PCT/US2023/010375.
International Search Report and Written Opinion issued Feb. 17, 2023 in International Application No. PCT/US2022/050346.
International Search Report and Written Opinion issued Feb. 17, 2023 in International Application No. PCT/US2022/050349.
Substantive Examination Report issued Mar. 24, 2023 in Indonesian Patent Application No. P00202106256 (with English translation).
Hamilton et al., "Proposed Text for ID Query Action Frame, " IEEE P802.11 Wireless LANS, 11-21/1379r3, Oct. 2021, 7 pages.
International Preliminary Report on Patentability issued Feb. 13, 2024 in International (PCT) Application No. PCT/US2022/029987.
International Preliminary Report on Patentability issued Feb. 13, 2024 in International (PCT) Application No. PCT/US2022/029805.
International Search Report and the Written Opinion of the International Searching Authority dated Aug. 8, 2022 in International (PCT) Application No. PCT/US2022/029805.
International Preliminary Report on Patentability dated Oct. 29, 2024 in International (PCT) Application No. PCT/US2023/020347.

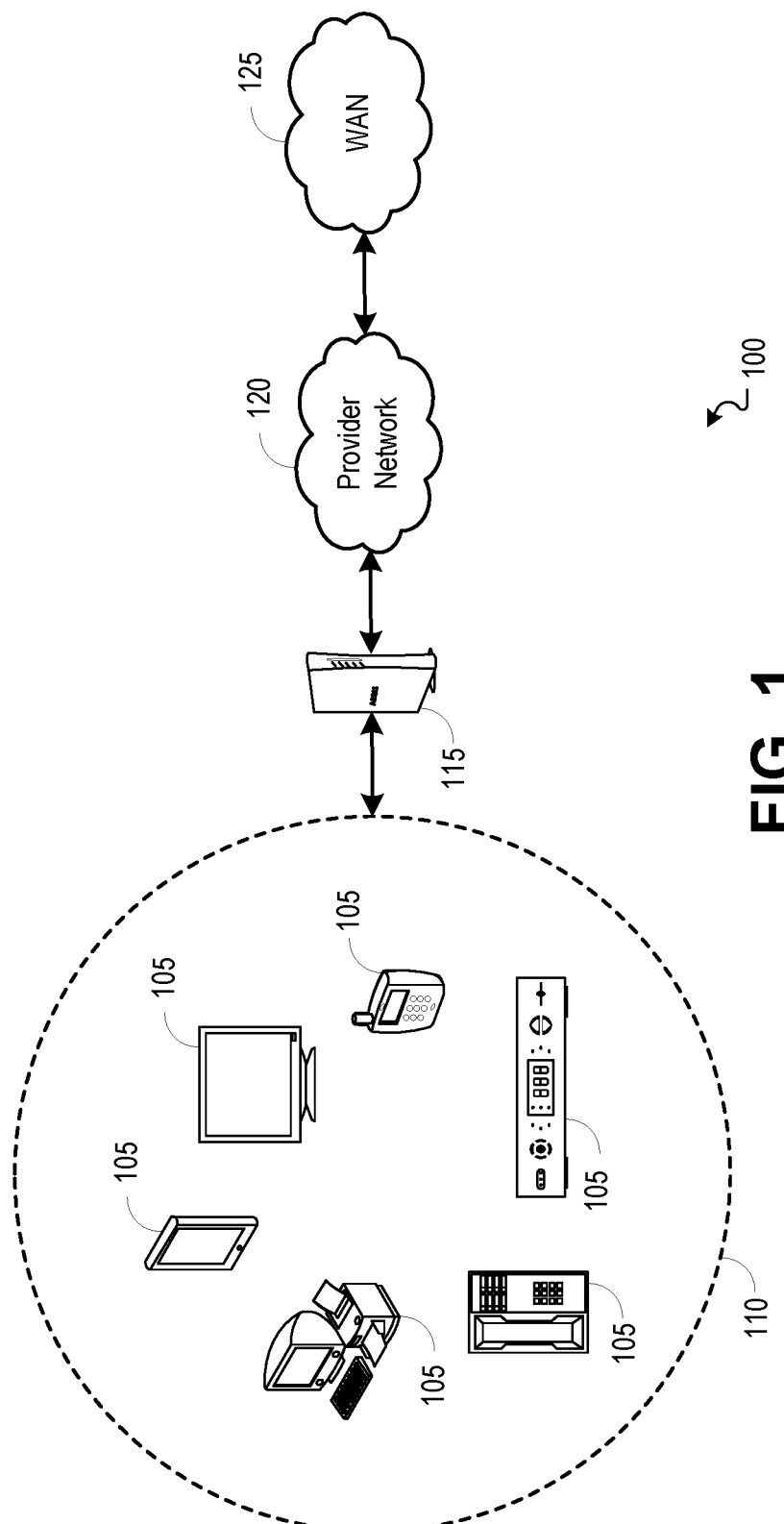

| Requesting Network Type | Encryption Enabled |
|---|---|
| 1 byte | 1 byte |

| Response Code | Identifier Length | Unique Identifier | Identifier Duration | Vendor Specific Information |
|---|---|---|---|---|
| 1 byte | 1 byte | Variable size | 2 bytes | 2 bytes |

| Category | ID Query Action | Vendor Specific Information |
|---|---|---|
| 1 Octet | 1 Octet | Variable Sizes |

310 — Category
315 — ID Query Action
320 — Vendor Specific Information
305

FIG. 3B

| Category | ID Query Action | ID Query Response | Identifier Length | Unique Identifier | Identifier Duration | Vendor Specific Information |
|---|---|---|---|---|---|---|
| 1 Octet | 1 Octet | 1 Octet | 2 Octets | 16 Octets | 2 Octets | Variable Sizes |

330 — Category
335 — ID Query Action
340 — ID Query Response
345 — Identifier Length
350 — Unique Identifier
355 — Identifier Duration
360 — Vendor Specific Information
325

PROTECTED PRE-ASSOCIATION STATION IDENTIFICATION

CROSS REFERENCE TO RELATED APPLICATION

This application is a continuation-in-part of U.S. application Ser. No. 17/406,757, which was filed Aug. 19, 2021 and entitled "Unsolicited Handling of Unique Identifiers for Stations", and U.S. application Ser. No. 17/406,692, which was filed Aug. 19, 2021 and entitled "Protected Pre-Association Station Identification", and U.S. application Ser. No. 17/514,232, which was filed Oct. 29, 2021 and entitled "Using a Network Requirements Field to Provide a Station Access to a Network", all claiming the benefit of U.S. application Ser. No. 16/743,623, which was filed Jan. 15, 2020 and entitled "Handling of Unique Identifiers for Stations", now U.S. Pat. No. 11,109,302, claiming the benefit of both U.S. Provisional Application Ser. No. 62/792,744, entitled "Handling of Randomized MAC Addresses in 802.11," which was filed on Jan. 15, 2019 and U.S. Provisional Application Ser. No. 62/875,279, entitled "Handling of Randomized MAC Addresses in 802.11," which was filed on Jul. 17, 2019, and all of which are incorporated herein by reference in their entirety.

TECHNICAL FIELD

This disclosure relates to an improved handling of unique identifiers for stations and in particular, to user control and configuration of a unique identifier associated with a station for use with an access point in a network.

BACKGROUND

Wireless devices (e.g., WLAN (wireless local area network) or Wi-Fi devices) are increasingly adopting randomized MAC (media access control) addresses. This poses a problem for many parts of WLAN (e.g., Wi-Fi) infrastructure that may use a MAC address of a wireless device as a unique identifier for the wireless device.

Different users may have different expectations or requirements for privacy. Some users may prioritize privacy above other considerations. For example, an end user in a public area may not wish to allow their presence to be tracked, while an end user at home may see value in allowing a device to be recognized and tracked so that other features, such as parental controls, can operate as expected. To provide such flexibility in configuration, a user is provided with a unique identifier user interface that allows a user to select whether to provide a unique identifier to a network which is outside of the MAC address.

Because many users take advantage of the current systems, they will experience a perceived loss of utility when they are forced to log in every time because the access point or a supervising system will not recognize the station. These users may view the ability to use a stored, randomized MAC address as still providing them with privacy when it really does not.

A network that utilizes random MAC addresses loses the ability to track a wireless or Wi-Fi device throughout the network. Therefore, it is desirable to improve upon methods and systems for handling unique identifiers for stations, including providing a user of a station control and the ability to configure a unique identifier to be associated with the station within a network which is outside of the MAC address provided to the WLAN.

SUMMARY OF THE INVENTION

An aspect of the present disclosure provides a method for generating a unique identifier associated with a station in a network. The method comprises determining that the network supports use of the unique identifier, determining a status of a unique identifier setting, configuring a unique identifier user interface based on the status and the determination that the network supports use of the unique identifier, providing to a display device the unique identifier user interface, receiving via the unique identifier user interface one or more unique identifier configuration parameters, generating the unique identifier associated with the station based on at least one of the one or more unique identifier configuration parameters, and sending a message to the network, wherein the message comprises the unique identifier.

In an aspect of the present disclosure, the method further comprises establishing a secure connection with an access point of the network, and receiving a request from the access point for the unique identifier.

In an aspect of the present disclosure, the method is such the request comprises a unique identifier request action frame from the access point.

In an aspect of the present disclosure, the method further comprises storing the one or more unique identifier configuration parameters, wherein the one or more unique identifier configuration parameters comprise the unique identifier and a service set identifier (SSID), after receiving the request, determining the unique identifier based on the request, wherein the request comprises a network SSID, generating a unique identifier response action frame based on the unique identifier, wherein sending the message to the network comprises sending the unique identifier response action frame to the access point, and accessing one or more features of the network based on the unique identifier response action frame.

In an aspect of the present disclosure, the method is such that the configuring the unique identifier user interface comprises retrieving one or more previously stored unique identifier configuration parameters associated with the unique identifier and providing to the unique identifier user interface the one or more previously stored unique identifier configuration parameters, and the receiving the one or more unique identifier configuration parameters comprises updating the one or more previously stored unique identifier configuration parameters with the received one or more unique identifier configuration parameters, and the method further comprises storing the one or more unique identifier configuration parameters.

In an aspect of the present disclosure, the method further comprises determining that the unique identifier has expired based on at least one of the one or more unique identifier configuration parameters, and deleting the one or more unique identifier configuration parameters associated with the unique identifier.

In an aspect of the present disclosure, the method is such that the one or more unique identifier configuration parameters comprises any of a unique identifier, a service set identifier (SSID), a unique identifier setting, a unique identifier duration, and any combination thereof.

An aspect of the present disclosure provides a station for generating a unique identifier associated with the station in a network, the access point comprising. The station comprises a memory storing one or more computer-readable instructions and a processor configured to execute the one or more computer-readable instructions to determine that the network supports use of the unique identifier, determine a status of a unique identifier setting, configure a unique identifier user interface based on the status o and the determination that the network supports use of the unique identifier, provide to a display device the unique identifier user interface, receive via the unique identifier user interface one or more unique identifier configuration parameters, generate the unique identifier associated with the station based on at least one of the one or more unique identifier configuration parameters, and send a message to the network, wherein the message comprises the unique identifier.

In an aspect of the present disclosure, the processor is further configured to execute the one or more computer-readable instructions to establish a secure connection with an access point of the network, and receive a request from the access point for the unique identifier.

In as aspect of the present disclosure, the request comprises a unique identifier request action frame from the access point.

In an aspect of the present disclosure, the processor is further configured to execute the one or more computer-readable instructions to store the one or more unique identifier configuration parameters, wherein the one or more unique identifier configuration parameters comprise the unique identifier and a service set identifier (SSID), after receiving the request, determine the unique identifier based on the request, wherein the request comprises a network SSID, generate a unique identifier response action frame based on the unique identifier, wherein sending the message to the network comprises sending the unique identifier response action frame to the access point, and access one or more features of the network based on the unique identifier response action frame.

In an aspect of the present disclosure, the configuring the unique identifier user interface comprises retrieving one or more previously stored unique identifier configuration parameters associated with the unique identifier and providing to the unique identifier user interface the one or more previously stored unique identifier configuration parameters, the receiving the one or more unique identifier configuration parameters comprises updating the one or more previously stored unique identifier configuration parameters with the received one or more unique identifier configuration parameters, and the processor is further configured to execute the one or more computer-readable instructions to store the one or more unique identifier configuration parameters.

In an aspect of the present disclosure, the processor is further configured to execute the one or more computer-readable instructions to determine that the unique identifier has expired based on at least one of the one or more unique identifier configuration parameters, and delete the one or more unique identifier configuration parameters associated with the unique identifier.

In an aspect of the present disclosure, the one or more unique identifier configuration parameters comprises any of a unique identifier, a service set identifier (SSID), a unique identifier setting, a unique identifier duration, and any combination thereof.

An aspect of the present disclosure provides a non-transitory computer-readable medium of a station storing one or more computer-readable instructions for generating a unique identifier associated with the station in a network, the one or more computer-readable instructions that when executed by a processor of the station cause the station to perform one or more operations of any one or more of the above method steps.

BRIEF DESCRIPTION OF THE DRAWINGS

FIG. 1 is a block diagram illustrating an example network environment operable to facilitate management of a unique identifier for a station.

FIG. 2A shows an example format for a unique identifier request.

FIG. 2B shows an example format for a unique identifier response.

FIG. 3A shows an example format for a unique identifier request that includes an ID (identifier) query action field.

FIG. 3B shows an example format for a unique identifier response that includes an ID query action field.

Like reference numbers and designations in the various drawings indicate like elements.

DETAILED DESCRIPTION

Figure 4:
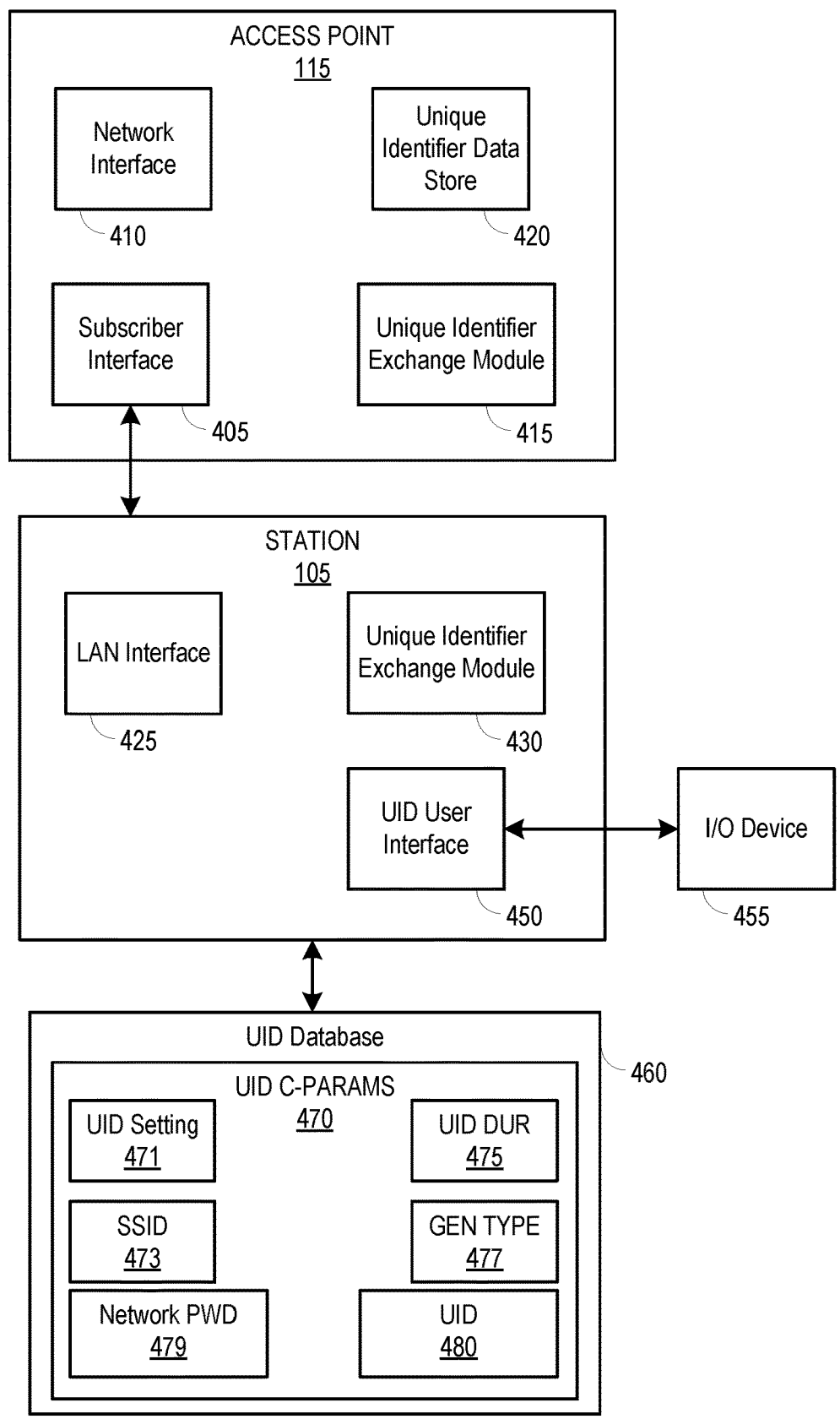
FIG. 4 is a block diagram illustrating an example access point operable to facilitate management of a unique identifier for a station.

It is desirable to improve upon methods and systems for handling unique identifiers for stations. Methods, systems, and computer readable media can be operable to facilitate an exchange of messages between an access point and a station, wherein the access point requests a unique identifier from the station. The station may either respond with a message declining to provide a unique identifier or respond with a message including a unique identifier to be used by the access point for the station. The response from the station may include additional limitations on the use of the unique identifier by the access point or the network. The access point or the network may enforce different policies against a station depending upon how the station responds to the unique identifier request.

Described herein is an addition of a new message to 802.11 that explicitly allows an access point to ask a station for a unique identifier that it wishes to make known. The message cannot force a station to disclose information since some stations may choose to have decreased performance to preserve their privacy, but it allows a station to share information which is not in the standard today. Throughout this disclosure, a unique identifier may also be referred to or be the same as a private identifier.

FIG. 1 is a block diagram illustrating an example network environment 100 operable to facilitate management of a unique identifier for a station. In embodiments, video, voice, and/or data services may be delivered to one or more stations 105 over one or more signal paths. Stations 105 may include a laptop, mobile device, tablet, computer, set-top box (STB), gaming device, wearable device, and any other device operable to receive video, voice, and/or data services. It should be understood that various data, multimedia, and/or voice services may be delivered to the stations 105, including but not limited to streaming video, streaming audio, file transfer, email, telephony services, and others.

Multiple services may be delivered to stations 105 over one or more local wireless networks 110. The local wireless network(s) 110 may include a wireless local area network (WLAN), personal area network (PAN), mobile hotspot network, and others. The local network 110 may be provided at a subscriber premise by one or more access points 115. An access point 115 may be, for example, a CPE (customer premise equipment) device and may include any device configured to facilitate communications between a Wide Area Network (WAN) and one or more stations 105, such as a modem, multimedia terminal adapter (MTA), embedded MTA (EMTA), gateway device, network extender, or other access device. An access point 115 may be integrated with other devices. For example, an access point 115 may include a broadband access modem (e.g., a modem may reside within a gateway device, STB, or other devices). It should be understood that delivery of the multiple services over the local network(s) 110 may be accomplished using a variety of standards and formats. It will be appreciated by those skilled in the relevant art that stations 105 may be capable of interacting and communicating with each other and/or with an access point 115 over various wireless communication standards (e.g., Wi-Fi, Bluetooth, etc.).

In embodiments, an access point 115 may be connected to a broadband access network 120 and may route communications between one or more stations 105 and a WAN (wide-area network) 125 through the connection to the broadband access network 120. Note that the broadband access network may itself be wired or wireless.

In general, and according to wireless communication standards, a station 105 will constantly probe for a new network if the station 105 is not currently connected. Typically, the probe messages contain, among other fields, a MAC (media access control) address for the station 105. A coordinated network may track movements of an end user by tracking the probe messages received at different access points if the network has knowledge of the MAC address of the end user's device.

To offer additional privacy to an end user, MAC randomization may be utilized. Randomized MAC addresses may be facilitated by using MAC addresses from the local MAC address space. A local MAC address can be identified if a "local" bit is set (e.g., second bit of the first byte of the MAC address). Use of a local MAC address space minimizes the chance of a device choosing a MAC address that might already be in use by another device. Use of this MAC address space also suggests to a receiving device (e.g., access point) that it has received a randomized MAC (rMAC) address which may influence actions that it takes with respect to that station.

Different device vendors have chosen to make use of randomized MAC addresses in different ways. For example, when a station is unassociated, the station may be configured to use a randomized MAC address that changes periodically when sending probe requests (e.g., rMAC is changed with each probe request, rMAC is changed after a specific time interval, etc.). A station may be configured to use an rMAC as a default option or as an option selected by an end user. When a station is associating with an SSID (service set identifier) provided by an access point, the station may be configured to use the same rMAC consistently for a given SSID, use a new rMAC for each association to an SSID, or may change an rMAC after a certain time interval (e.g., a new rMAC for each day, week, etc.). After a station has completed association, the station may be configured to use the same rMAC or may be configured to periodically change the rMAC used by the station after some event, such as the loss and reacquisition of that association. The association of a station 105 with an access point 115 may include the process of the station 105 joining a service set (e.g., SSID) or network that is provided by the access point 115.

In embodiments, the access point 115 may be configured to provide various features such as parental controls, device steering, and others depending upon the ability of the access point 115 to consistently identify a station 105 across association events. Additionally, infrastructure systems may use past behavior to provide improved steering and other services to a station 105, which would not be available if the station 105 cannot be recognized when it returns to the infrastructure ESS (extended service set)/BSS (basic service set).

To allow flexibility, a secured communication exchange (e.g., action frame exchange) is defined herein to allow an access point 115 to ask a station 105 for an additional, unique identifier. The communication exchange may include a unique identifier request that is output from the access point 115, and received by a station 105, and a unique identifier response that is transmitted from the station 105, to the access point 115, in response to unique identifier request. An access point 115 may enforce different policies against a station 105 depending upon how the station 105 responds to the unique identifier request. The communication exchange between the access point 115 and station 105 may be secured and kept private. The unique identifier request and unique identifier response messages may be wireless communications (e.g., 802.11 messages).

In embodiments, the request for a unique identifier may include an identification of type of network (e.g., network associated with an SSID) provided by the access point 115 (e.g., private data network, private guest network, hotspot network, public network, etc.) and/or an indication as to whether the network provided by the access point 115 is encrypted or not encrypted. The station 105 may be configured to respond to the unique identifier request based upon the type of network identified by the request and/or whether encryption is enabled. For example, the station 105 may apply a filter to the identification of the network type within the request to determine whether to respond. Based on the information within the request, the station 105 may determine the encryption on the information it provides. In embodiments, the unique identifier request may include an identification of a network encryption type.

In embodiments, a unique identifier response may include an indication whether the station 105 is providing the access point 115 with a unique identifier. For example, the station 105 may be configured to determine whether to provide a unique identifier based upon the type of network and/or encryption provided by the access point 115. The unique identifier response may include an identification of a length of a unique identifier to be associated with the station 105 and may include the unique identifier that is to be associated with the station 105. In embodiments, the unique identifier response may include an optional field for an identifier duration value. If no identifier duration value is included, the access point 115 may use the unique identifier for the station 105 for a default duration of time (e.g., only during the current association of the station 105 with the access point 115, permanently, etc.). Alternatively, the identifier duration value may indicate that the unique identifier is to be used for the station 105 only for the duration of the current association between the station 105 and the access point 115, upon which the access point 115 will store the unique identifier for the station 105 until the current association between the station 105 and the access point 115 ends. As another example, the identifier duration value may include a specific duration (e.g., time in seconds) for which the access point 115 stores the unique identifier for the station 105. In embodiments, the unique identifier response may include an optional field in which vendor specific options may be included.

When, during a first association between an access point 115 and a station 105, the access point 115 is authorized to permanently store the unique identifier for the station 105, the access point 115 may continue to store and/or use the unique identifier for the station 105. After the first association has ended, and during a second or subsequent association between the station 105 and the access point 115, the station 105 may be using a different identifier (e.g., rMAC) than one that was used by the station 105 during the first association between the access point 115 and the station 105. However, during the second or subsequent association, the station 105 may be using the same unique identifier (e.g., a unique identifier provided to the access point 115 through a unique identifier response) as the one that was used by the station 105 during the first association. In embodiments, during the second association between the access point 115 and the station 105, the access point 115 may recognize that the station 105 is using the same unique identifier as one that was previously used by the station during a previous association. In response, the access point 115 may use authorization(s) and/or behaviors, and/or enable one or more services or features that were used and/or enabled during a previous association between the access point 115 and the station 105. During the second or subsequent associations between the access point 115 and the station 105, the access point 115 may use these authorization(s) and/or permissions, and/or enable these services or features without requesting corresponding authorization(s) and/or permission(s) from the station 105 during the second/subsequent association(s) between the access point 115 and the station 105.

In embodiments, a station 105 may be configured with one or more requirements and/or limitations to be placed on an associated unique identifier. For example, the station 105 may decline to provide a unique identifier to an access point 115 when a type of network and/or an encryption status of a network with which the station 105 is associated do not meet certain criteria. Based on the network type and/or encryption status of a network, the station 105 may respond to a unique identifier request with a unique identifier response that does not include a unique identifier. Alternatively, if the network type and/or encryption status of the network meet certain criteria, the station 105 may generate a unique identifier response that provides the access point 115 with a unique identifier for the station 105 but limits the use or duration for which the access point 115 may use/store the unique identifier (e.g., a use limitation may be included in the unique identifier response).

In embodiments, a station 105 may generate a unique identifier based upon an algorithm with which the station 105 is configured and/or based upon a user input of a unique identifier or criteria for generating a unique identifier. For example, an end user may input a unique identifier to be used by the station 105, or the station 105 may be configured to generate a random unique identifier based upon a key. The unique identifier provided by the station 105 may be an identifier other than a MAC address of the station 105 or it may be the MAC address of the station 105.

The action frame may be available to an access point 115 after a station 105 has become associated. The action frame and response may be encrypted, assuming that the association is with a secure SSID so that the unique identifier provided by the station 105 within a response is protected from a person who is receiving the wireless transmission. A station 105 may consider only responding to the unique identifier request if the SSID is secure. For example, the station 105 may be configured to disregard a unique identifier request when the station 105 is associated with a network that is not secure (e.g., a public network or unencrypted network).

It should be understood that various requirements for and/or restrictions on the form of a unique identifier may be implemented. For example, a unique identifier may be required to be from a local MAC address space, or to take a certain form such as the UUID form popularized by Microsoft. A scenario may exist where only a specific configuration may be accepted by an access point as a unique identifier. In embodiments, an access point 115 may be able to ask any station 105 for a permanent unique identifier (e.g., a permanent MAC address, serial number, or other identifier).

A station 105 may present a local MAC address or an otherwise randomized MAC address while probing or after association. For some access points 115 and associated network services, a local MAC address that may change with each ESS association may restrict the services that an access point 115 can offer without additional authentication. An access point may use the unique identifier request message to request that an associated station 105 provide an identifying value that can be used across association events to consistently identify the particular station 105, even if its MAC address changes. The unique identifier request message may also include vendor specific information. Since the unique identifier request message is sent after a secure association is in place and PMF has been negotiated between the requesting access point 115 and the target station 105, then the unique identifier in the unique identifier response will be secure and kept private.

A station 105 may receive a unique identifier request message from its associated access point 115 after a secure association is in place. The station 105 may respond with a unique identifier response that declines to provide the requesting access point 115 with a unique identifier, for example, if the station 105 does not trust the access point 115. The station 105 may respond with a unique identifier and also indicate the amount of time that the access point 115 may expect that unique identifier to be valid in an identifier duration field. If the station 105 does not indicate an identifier duration for the unique identifier, then the access point 115 may consider the unique identifier to be permanent. The unique identifier response may also include vendor specific information. An access point 115 might restrict access to the DS (downstream) in an implementation specific manner based on the unique identifier response or lack thereof from the station 105.

FIG. 2A shows an example format for a unique identifier request 205. The unique identifier request 205 may be transmitted from an access point 115 of FIG. 1 to a station 105 of FIG. 1 after the station 105 is associated with the access point 115. The unique identifier request 205 may be, for example, a secured action frame. The unique identifier request 205 may include a requesting network type field 210 and an encryption enabled field 215. A value (e.g., 1 byte) within the requesting network type field 210 may be used to identify a type of network with which a station is associated (e.g., value of 1=private data network; 2=private guest network; 3=hotspot network; etc.). A value (e.g., 1 byte) within the encryption enabled field 215 may be used to identify whether or not the network with which a station is associated is encrypted or not (e.g., value of 0=not encrypted; 1=encrypted; etc.).

FIG. 2B shows an example format for a unique identifier response 220. The unique identifier response 220 may be transmitted from a station 105 to an access point 115 in response to receiving a unique identifier request from the access point 115. The unique identifier response 220 may be, for example, a secured action frame. The unique identifier response 220 may include a response code field 225, an optional identifier length field 230, an optional unique identifier field 235, an optional identifier duration field 240, and/or an optional vendor specific information field 245. A value (e.g., 1 byte) within the response code field 225 may be used to identify whether a station is providing a unique identifier to be used by the access point for the station (e.g., a value of 0=decline to provide a unique identifier; 1=unique identifier is provided, etc.). A value (e.g., 1 byte) within the identifier length field 230 may be used to identify the length of a unique identifier that is provided. A unique identifier to be used by the access point for the station may be provided within the unique identifier field 235. A value (e.g., 2 bytes) within the identifier duration field 240 may be used to identify a duration for which the access point is to use the unique identifier provided for the station (e.g., 0=use unique identifier only for current association; 1-FFFF=a time in seconds for which the unique identifier is to be used, etc.). If the identifier duration field 240 is left blank, the access point may use the unique identifier for a default duration (e.g., permanently or some other specific duration of time). The vendor specific information field 245 may be used to provide any additional information or parameters associated with the station.

FIG. 3A shows an example format for a unique identifier request 305 that includes an ID (identifier) query action field. The unique identifier request 305 may be transmitted from an access point 115 of FIG. 1 to a station 105 of FIG. 1 after the station 105 is associated with the access point 115. The unique identifier request 305 may include a category field 310, an ID query action field 315, and an optional vendor specific information field 320. In embodiments, an ID query action field may be included within the unique identifier request and/or unique identifier response. Two action frame formats are defined to allow an access point 115 to query a station 105 for a unique identifier. An ID query action field, in the octet field immediately after the category field differentiates the formats. The ID query may be sent whether or not the station 105 provided a local MAC address.

The ID query request frame uses the action frame body format. It is transmitted from an access point to a station to request that the station provide a unique identifier that the access point may store and use for future identification of the station. The format of the action field in the ID query request frame is shown in FIG. 3A. The vendor specific information field 320 is optionally present and may include one or more vendor-specific elements.

FIG. 3B shows an example format for a unique identifier response 325 that includes an ID query action field. The unique identifier response 325 may be transmitted from a station 105 to an access point 115 in response to receiving a unique identifier request from the access point 115. The unique identifier response 325 may include a category field 330, an ID query action field 335, an ID query response field 340, an optional identifier length field 345, an optional unique identifier field 350, an optional identifier duration 355, and an optional vendor specific information field 360. The ID query response frame uses the action frame body format. The unique identifier response 325 is transmitted from a station to an access point in response to a request that the station provide a unique non-transitory identifier.

An embodiment of the format of the action field in the ID query response frame is shown in FIG. 3B. A value in the ID query response field may be used to identify whether the station declines to provide a unique identifier, or the station is providing a unique identifier. The station has the option to indicate that it will not provide a unique identifier value or that it will. When the ID query response field value is 0, the identifier length field, unique identifier field, identifier duration field and vendor specific information field are not present. When the ID query response field value is 1, the identifier length field, unique identifier field, identifier duration field and vendor specific information field are optionally present. The identifier length field indicates the length of the response in octets. The unique identifier field provides the identification value that the requesting access point may use to identify this station without regard to the MAC address used by the station in the MAC header. The unique identifier field 350 may have one or more minimal requirements (e.g., 16 octets, large enough to allow the use of a UUID, etc.). A value within the identifier duration field may be used to identify a duration for which the access point is to use the unique identifier provided for the station (e.g., 0=use unique identifier only for current association; 1-65535=a time in minutes for which the unique identifier is to be used, etc.). A station may indicate that the unique identifier is permanent by not including this field while including a unique identifier in the unique identifier response 325. Otherwise, the lifetime of the unique identifier is as indicated.

The station capabilities information elements exchanged during association may include an extended capability bit to indicate whether a station can support an ID query action frame. For example, the extended capability bit may be set to 1 to indicate that a station can support an ID query action frame. At a higher layer, a user may direct a station to not share a permanent or semi-permanent identifier, so a station may still decline to provide a unique identifier even though it indicates support for the message. The vendor specific information field is optionally present when the ID query response field is 0 or 1 and includes one or more vendor-specific elements.

FIG. 4 is a block diagram illustrating an example access point 115 operable to facilitate management of a unique identifier for a station 105. The access point 115 may include a subscriber interface 405, a network interface 410, a unique identifier exchange module 415, and a unique identifier data store 420. The station 105 may include a LAN interface 425 and a unique identifier exchange module 430.

In embodiments, communications may be output to and/or received from one or more stations 105 through a subscriber interface 405. Wireless communications and messages, comprising data, video, and/or voice communications, may be output from and/or received through the subscriber interface 405. It should be understood that the subscriber interface 405 may be configured to receive and/or output communications using various communication techniques, protocols, and standards (e.g., Wi-Fi). In embodiments, communications may be output to and/or received from one or more upstream networks (e.g., broadband access network 120 of FIG. 1, WAN 125 of FIG. 1, etc.) through the network interface 410.

In embodiments, the unique identifier exchange module 415 may generate and output unique identifier request messages. The unique identifier exchange module 415 may receive unique identifier response messages from stations 105, and the unique identifier exchange module 415 may ignore or store unique identifiers provided by unique identifier response messages according to various limitations and/or use/storage requirements retrieved from the unique identifier response messages. For example, the unique identifier exchange module 415 may store unique identifiers for one or more stations 105 within the unique identifier data store 420 (e.g., an association between a unique identifier and a station from which the unique identifier is received may be stored). The unique identifier provided by a unique identifier response that is received from a station may be stored as an identifier to be used to identify the specific station.

The unique identifier exchange module 415 may facilitate the use of unique identifiers for one or more stations to enable or disable one or more services or features provided to the stations 105 by the access point 115 (e.g., parental controls, device tracking, etc.). For example, when a station 105 provides a unique identifier for use by the access point 115, the access point 115 may enable one or more features or services offered to the station by the access point, wherein the one or more services require the use of a consistent and unique identifier of the station. When a station 105 declines to provide a unique identifier for use by the access point 115, the access point 115 may disable one or more features or services offered to the station by the access point, wherein the one or more services require the use of a consistent and unique identifier of the station.

In embodiments, a station 105 may transmit communications to and receive wireless communications from an access point 115 through the LAN interface 425.

The unique identifier exchange module 430 may receive unique identifier request messages from the access point 115 and generate and output unique identifier response messages. In embodiments, the unique identifier exchange module 430 may retrieve and/or generate a unique identifier for the station 105, and the unique identifier exchange module 430 may populate a unique identifier response message with the unique identifier for the station and/or one or more other field values (e.g., identifier duration value, vendor specific information, etc.). The unique identifier exchange module 430 may be configured with parameters and requirements (e.g., network type and/or encryption status requirements) for responding to a unique identifier request message.

The station 105 can configure a unique identifier (UID) user interface 450 and provide the unique identifier user interface 450 to an input and/or output (I/O) device 455. The I/O device 455 can be connected or otherwise coupled to the station 105 or be part of or included within the station 105. The I/O device 455 can comprise any of a display device (for example, any type of monitor such as a liquid crystal display (LCD), a light emitting diode (LED) display, a plasma display, a cathode ray tube (CRT) display, organic light emitting diode (OLED) display, a monitor with a touch-screen capability, any other monitor or display, or any combination thereof), a keyboard, a mouse, a microphone, a speaker, any other input and/or output device, or any combination thereof. The unique identifier user interface 450 can provide to a display device, such as I/O device 455, one or more messages, one or more unique identifier configuration parameters (UID C-PARAMS) 470 associated with a station 105, a unique identifier associated with the station 105, or both, or any other information associated with the station 105, a unique identifier associated with the station 105, or both. Any of the one or more UID C-PARAMS 470, for example, received via the unique identifier interface 450 or otherwise configured, can be stored in a UID database 460. The UID C-PARAMS 470 can comprise any of a unique identifier setting 471 (for example, that indicates whether a unique identifier or the generation of use of a unique identifier is enabled or disabled), an SSID 473 (for example, that indicates an SSID associated with a wireless network), a unique identifier duration (UID DUR) 475 (for example, that indicates the duration that an associated unique identifier is active or enabled), a unique identifier generation type (GEN TYPE) 477 (for example, that indicates how a unique identifier is to be generated), a network password (Network PWD) 479 (for example, a password that is required by the network), a unique identifier (UID) 480 (for example, an identifier that is unique within the wireless network to the station 105), any other parameter associated with configuring a unique identifier associated with the station 105, or any combination thereof. The UID database 460 can comprise any type of storage system including any of a flat-file system, a linked-list system, one or more tables, an indexed system, any other database system, or any combination thereof. The UID database 460 can be connected or otherwise coupled to the station 105 as illustrated in FIG. 4 or included within or as part of the station 105. The unique identifier database 460 can be located remote from or local to the station 105, the access point 115, or both. While FIG. 4 illustrates the unique identifier database 460 as a database, the present disclosure contemplates that the unique identifier database 460 can be any type of memory, storage medium, storage device, or any combination thereof for example, as discussed with reference to FIG. 11.

Figure 5:
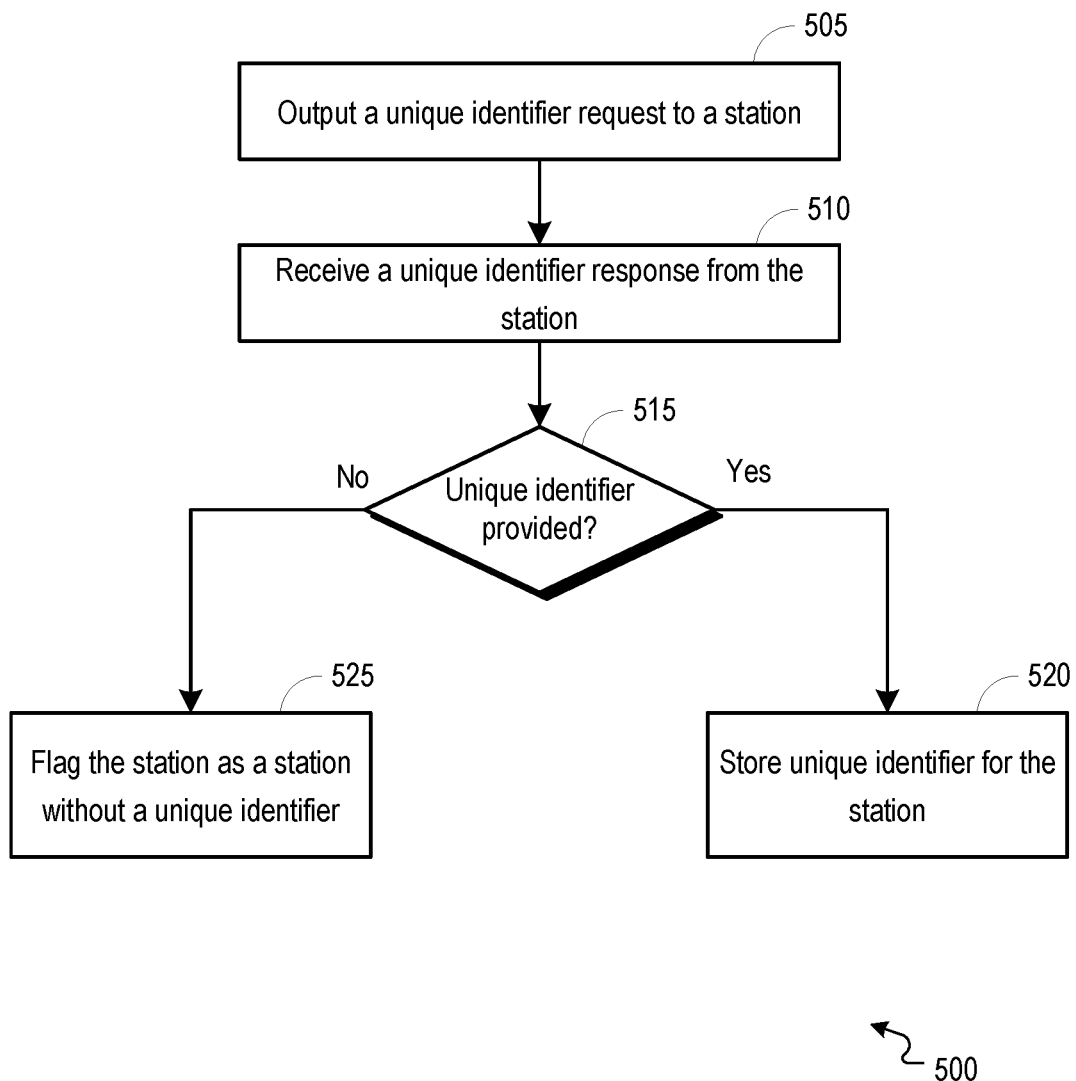
FIG. 5 is a flowchart illustrating an example process operable to facilitate managing a unique identifier recovered from a unique identifier response that is received from a station.

FIG. 5 is a flowchart illustrating an example process 500 operable to facilitate managing a unique identifier recovered from a unique identifier response that is received from a station. The process 500 can begin after a station (e.g., station 105 of FIG. 1) is associated with an access point (e.g., access point 115 of FIG. 1). The unique identifier response/request messages may be facilitated by a unique identifier exchange module 415 of FIG. 4 and/or a unique identifier exchange module 430 of FIG. 4. The process 500 can begin at 505, when a unique identifier request is output to a station 105. When the station 105 has been associated with the access point 115, the access point 115 may generate and transmit a unique identifier request (e.g., unique identifier request 205 of FIG. 2A or 305 of FIG. 3A) to the station 105. The unique identifier request comprises a request that the station respond with a unique identifier that is to be used by the access point for the station.

At 510, a unique identifier response may be received from the station. For example, the access point 115 may receive the unique identifier response (e.g., unique identifier response 220 of FIG. 2B or 325 of FIG. 3B) from the station 105, and the unique identifier response may include an indication that the station either is or is not providing a unique identifier that is to be used for the station. The indication may be provided within a response code field 225 of FIG. 2B or ID query response field 340 of FIG. 3B.

At 515, a determination may be made whether the unique identifier response provides a unique identifier to be used for the station. In embodiments, the access point 115 may make this determination based upon whether a unique identifier is present within the unique identifier response or based upon whether the unique identifier response provides an indication whether a unique identifier is provided by the response.

If, at 515, the determination is made that a unique identifier is provided by the unique identifier response, the process 500 may proceed to 520. At 520, the access point 115 may store the unique identifier for the station 105. For example, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

If, at 515, the determination is made that a unique identifier is not provided by the unique identifier response, the process 500 may proceed to 525. At 525, the station 105 may be flagged as a station without a unique identifier. The access point may flag the station 105 as having declined or as being unable to provide a unique identifier other than an identifier that is already known (e.g., a MAC address of the station 105) to the access point 115. Alternatively, the access point 115 may simply do nothing in response to the determination that a unique identifier is not provided by the unique identifier response.

Figure 6:
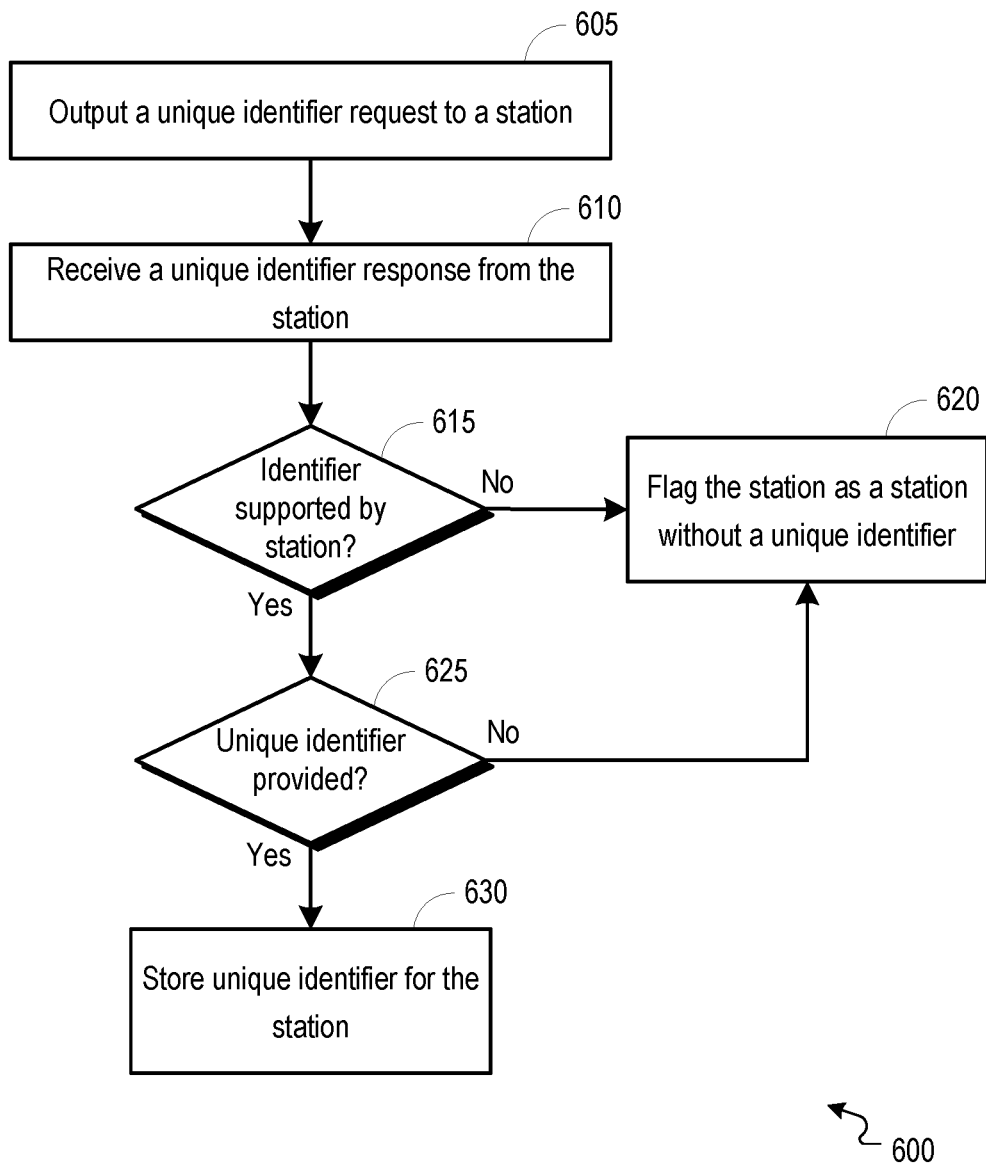
FIG. 6 is a flowchart illustrating an example process operable to facilitate managing a unique identifier recovered from a unique identifier response that is received from a station that supports an exchange of unique identifier messages.

FIG. 6 is a flowchart illustrating an example process 600 operable to facilitate managing a unique identifier recovered from a unique identifier response that is received from a station that supports an exchange of unique identifier messages. The process 600 can begin after a station (e.g., station 105 of FIG. 1) is associated with an access point (e.g., access point 115 of FIG. 1). Unique identifier response/request messages may be facilitated by a unique identifier exchange module 415 of FIG. 4 and/or a unique identifier exchange module 430 of FIG. 4. The process 600 can begin at 605, when a unique identifier request is output to a station 105. When the station 105 has been associated with the access point 115, the access point 115 may generate and transmit a unique identifier request (e.g., unique identifier request 205 of FIG. 2A or 305 of FIG. 3A) to the station 105. The unique identifier request may include a request that the station respond with a unique identifier that is to be used by the access point for the station.

At 610, a unique identifier response may be received from the station. For example, the access point 115 may receive the unique identifier response (e.g., unique identifier response 220 of FIG. 2B or 325 of FIG. 3B) from the station 105, and the unique identifier response may include an indication whether the station 105 supports the creation and delivery of a unique identifier to the access point 115 (e.g., the indication may be provided within a response code field 225 of FIG. 2B, an ID query action field 335 of FIG. 3B, an ID query response field 340 of FIG. 3B, or other field of the response). The unique identifier response may include an indication that the station either is or is not providing a unique identifier that is to be used for the station. The indication may be provided within a response code field 225 of FIG. 2B or ID query response field 340 of FIG. 3B.

At 615, a determination may be made whether the station supports the creation and delivery of a unique identifier to the access point. For example, the access point 115 may determine whether the station 105 can provide a unique identifier (other than a known identifier such as a MAC address) based upon an indication provided within the unique identifier response. In embodiments, this determination may be made based upon the value of a capability bit. For example, if the capability bit is not set, the access point 115 may not ask the station 105 for a unique identifier.

If, at 615, the determination is made that the station does not support the creation and delivery of a unique identifier, the process 600 may proceed to 620. At 620, the station 105 may be flagged as a station without a unique identifier. The access point 115 may flag the station 105 as being unable to provide a unique identifier other than an identifier that is already known (e.g., a MAC address of the station 105) to the access point 115. Alternatively, the access point 115 may simply do nothing in response to the determination that the station cannot provide a unique identifier.

If, at 615, the determination is made that the station is capable of creating and delivering a unique identifier, the process 600 may proceed to 625. At 625, a determination may be made whether the unique identifier response provides a unique identifier to be used for the station. In embodiments, the access point 115 may make this determination based upon whether a unique identifier is present within the unique identifier response or based upon whether the unique identifier response provides an indication whether a unique identifier is provided by the response.

If, at 625, the determination is made that a unique identifier is not provided by the unique identifier response, the process 600 may proceed to 620. At 620, the station 105 may be flagged as a station without a unique identifier. The access point may flag the station 105 as having declined or as being unable to provide a unique identifier other than an identifier that is already known (e.g., a MAC address of the station 105) to the access point 115. Alternatively, the access point 115 may simply do nothing in response to the determination that a unique identifier is not provided by the unique identifier response.

If, at 625, the determination is made that a unique identifier is provided by the unique identifier response, the process 600 may proceed to 630. At 630, the access point 115 may store the unique identifier for the station 105. For example, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

Figure 7:
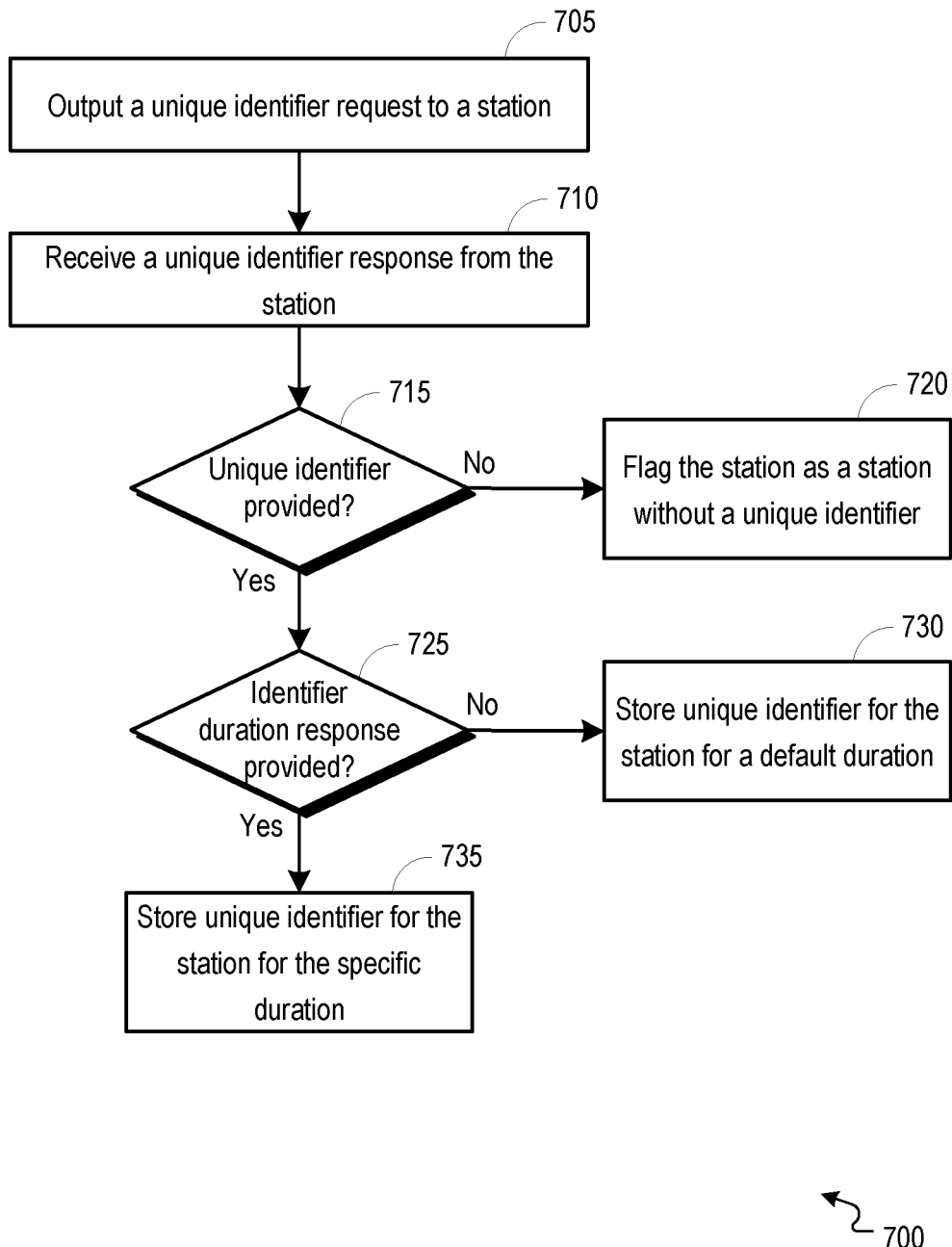
FIG. 7 is a flowchart illustrating an example process operable to facilitate managing a unique identifier recovered from a unique identifier response that is received from a station, wherein the unique identifier response includes an identifier duration field.

FIG. 7 is a flowchart illustrating an example process 700 operable to facilitate managing a unique identifier recovered from a unique identifier response that is received from a station, wherein the unique identifier response includes an identifier duration field. The process 700 can begin after a station (e.g., station 105 of FIG. 1) is associated with an access point (e.g., access point 115 of FIG. 1). Unique identifier response/request messages may be facilitated by a unique identifier exchange module 415 of FIG. 4 and/or a unique identifier exchange module 430 of FIG. 4. The process 700 can begin at 705, when a unique identifier request is output to a station 105. When the station 105 has been associated with the access point 115, the access point 115 may generate and transmit a unique identifier request (e.g., unique identifier request 205 of FIG. 2A or 305 of FIG. 3A) to the station 105. The unique identifier request may include a request that the station respond with a unique identifier that is to be used by the access point for the station.

At 710, a unique identifier response may be received from the station. For example, the access point 115 may receive the unique identifier response (e.g., unique identifier response 220 of FIG. 2B or 325 of FIG. 3B) from the station 105, and the unique identifier response may include an indication that the station either is or is not providing a unique identifier that is to be used for the station. The indication may be provided within a response code field 225 of FIG. 2B or ID query response field 340 of FIG. 3B.

At 715, a determination may be made whether the unique identifier response provides a unique identifier to be used for the station. In embodiments, the access point 115 may make this determination based upon whether a unique identifier is present within the unique identifier response or based upon whether the unique identifier response provides an indication whether a unique identifier is provided by the response.

If, at 715, the determination is made that a unique identifier is not provided by the unique identifier response, the process 700 may proceed to 720. At 720, the station 105 may be flagged as a station without a unique identifier. The access point may flag the station 105 as having declined or as being unable to provide a unique identifier other than an identifier that is already known (e.g., a MAC address of the station 105) to the access point 115. Alternatively, the access point 115 may simply do nothing in response to the determination that a unique identifier is not provided by the unique identifier response.

If, at 715, the determination is made that a unique identifier is provided by the unique identifier response, the process 700 may proceed to 725. At 725, a determination may be made whether an identifier duration is provided within the unique identifier response. In embodiments, the unique identifier response may include an identifier duration field (e.g., identifier duration field 240 of FIG. 2B or identifier duration field 355 of FIG. 3B). If the identifier duration field has a value of zero (0) or is otherwise left blank, the access point 115 (e.g., the unique identifier exchange module 415) may determine that no identifier duration is provided. If the identifier duration field has a value other than zero (0), the access point 115 (e.g., the unique identifier exchange module 415) may determine that an identifier duration is provided.

If, at 725, the determination is made that no identifier duration is provided by the unique identifier response, the process 700 may proceed to 730. At 730, the access point 115 may store the unique identifier for the station 105 for a default duration. For example, the access point 115 may store the unique identifier for the station for a default duration, the default duration being the duration of a current association between the station 105 and the access point 115, permanently storing the unique identifier at the access point 115, or some other duration of time that is set as the default duration. In embodiments, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

If, at 725, the determination is made that an identifier duration is provided by the unique identifier response, the process 700 may proceed to 735. At 735, the access point 115 may store the unique identifier for the station 105 for the specific duration that is provided by the unique identifier response. For example, a value within the identifier duration field of the unique identifier response may indicate a duration of time (e.g., number of seconds, minutes, etc.) for which the unique identifier is to be used by the access point 115, and the access point 115 may only use the unique identifier for the station for the indicated duration of time. In embodiments, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

Figure 8:
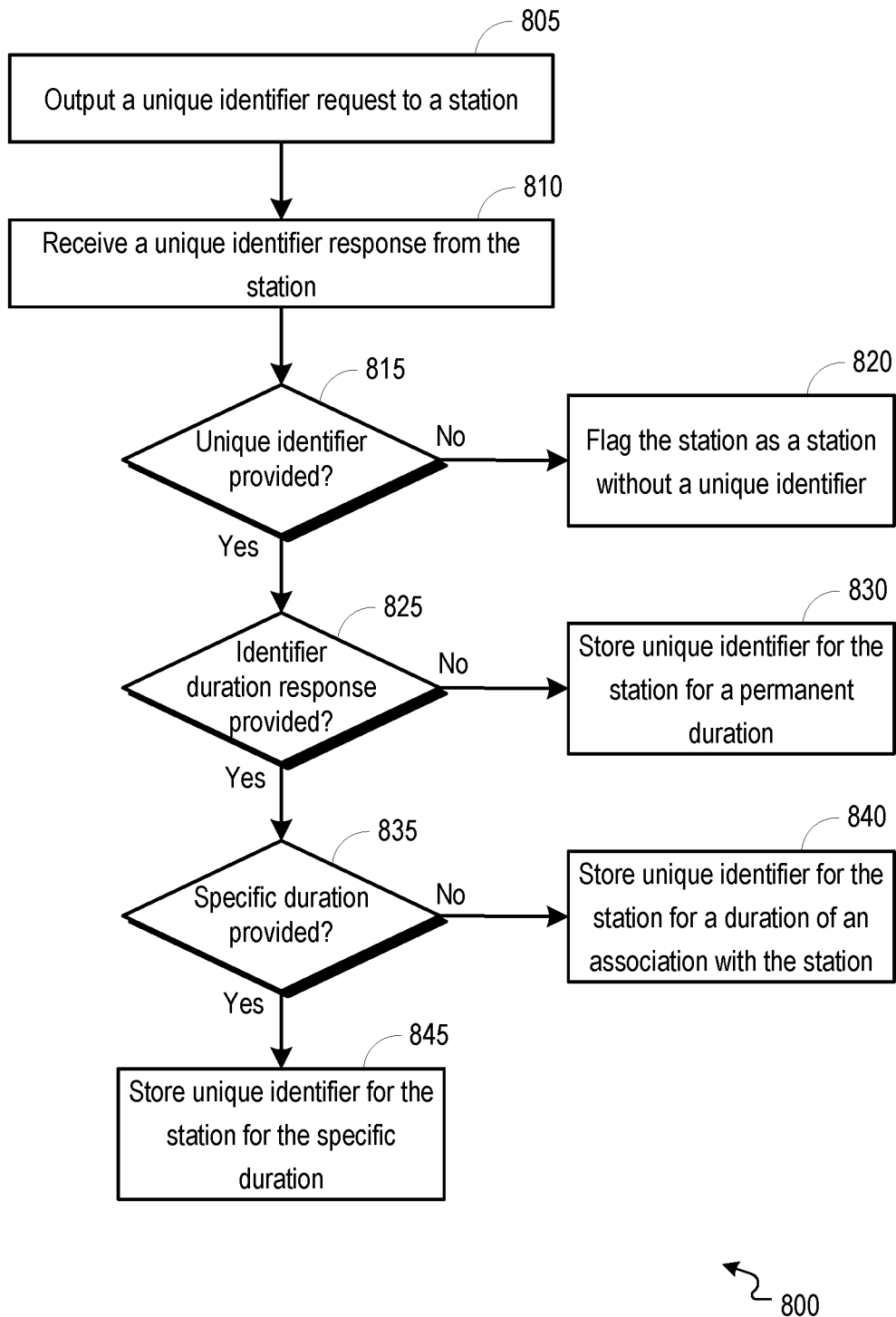
FIG. 8 is a flowchart illustrating an example process operable to facilitate managing a unique identifier recovered from a unique identifier response that is received from a station, wherein the access point permanently stores the unique identifier when an identifier duration response is not provided.

FIG. 8 is a flowchart illustrating an example process 800 operable to facilitate managing a unique identifier recovered from a unique identifier response that is received from a station, wherein the access point permanently stores the unique identifier when an identifier duration response is not provided. The process 800 can begin after a station (e.g., station 105 of FIG. 1) is associated with an access point (e.g., access point 115 of FIG. 1). Unique identifier response/request messages may be facilitated by a unique identifier exchange module 415 of FIG. 4 and/or a unique identifier exchange module 430 of FIG. 4. The process 800 can begin at 805, when a unique identifier request is output to a station 105. When the station 105 has been associated with the access point 115, the access point 115 may generate and transmit a unique identifier request (e.g., unique identifier request 205 of FIG. 2A or 305 of FIG. 3A) to the station 105. The unique identifier request may include a request that the station respond with a unique identifier that is to be used by the access point for the station.

At 810, a unique identifier response may be received from the station. For example, the access point 115 may receive the unique identifier response (e.g., unique identifier response 220 of FIG. 2B or 325 of FIG. 3B) from the station 105, and the unique identifier response may include an indication that the station either is or is not providing a unique identifier that is to be used for the station. The indication may be provided within a response code field 225 of FIG. 2B or ID query response field 340 of FIG. 3B.

At 815, a determination may be made whether the unique identifier response provides a unique identifier to be used for the station. In embodiments, the access point 115 may make this determination based upon whether a unique identifier is present within the unique identifier response or based upon whether the unique identifier response provides an indication whether a unique identifier is provided by the response.

If, at 815, the determination is made that a unique identifier is not provided by the unique identifier response, the process 800 may proceed to 820. At 820, the station 105 may be flagged as a station without a unique identifier. The access point 115 may flag the station 105 as having declined or as being unable to provide a unique identifier other than an identifier that is already known (e.g., a MAC address of the station 105) to the access point 115. Alternatively, the access point 115 may simply do nothing in response to the determination that a unique identifier is not provided by the unique identifier response.

If, at 815, the determination is made that a unique identifier is provided by the unique identifier response, the process 800 may proceed to 825. At 825, a determination may be made whether an identifier duration response is provided within the unique identifier response. In embodiments, the unique identifier response may include an identifier duration field (e.g., identifier duration field 240 of FIG. 2B or identifier duration field 355 of FIG. 3B). If the identifier duration field 240 is left off the unique identifier response, the access point 115 may determine that no identifier duration response is provided. If the identifier duration field 240 is included within the unique identifier response, the access point 115 may determine that an identifier duration response is provided.

If, at 825, the determination is made that no identifier duration response is provided, the process 800 may proceed to 830. At 830, the access point may store/use the unique identifier for the station for some duration. For example, the access point may not delete or terminate use of the unique identifier for a specific duration of time or after the current association between the access point and the station is ended. In embodiments, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

If, at 825, the determination is made that an identifier duration response is provided, the process 800 may proceed to 835. At 835, a determination may be made whether a specific duration is provided by the identifier duration response. For example, if the identifier duration response includes a value of zero (0) or some other default value, the access point 115 may determine that no specific duration is provided, and if the identifier duration response includes any other value, the access point 115 may determine that a specific duration is provided.

If, at 835, the determination is made that no specific identifier duration is provided by the identifier duration response, the process 800 may proceed to 840. At 840, the access point 115 may store the unique identifier for the station 105 for a default duration. For example, the default duration may be the duration of a current association between the station 105 and the access point 115, in which case, the access point 115 will delete or otherwise stop using the unique identifier for the station after the current association between the station and the access point is ended. In embodiments, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

If, at 835, the determination is made that a specific identifier duration is provided by the identifier duration response, the process 800 may proceed to 845. At 845, the access point 115 may store the unique identifier for the station 105 for the specific duration that is provided by the identifier duration response. For example, a value within the identifier duration field of the unique identifier response may indicate a duration of time (e.g., number of seconds, minutes, etc.) for which the unique identifier is to be used by the access point 115, and the access point 115 may only use the unique identifier for the station for the indicated duration of time. In embodiments, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

Figure 9:
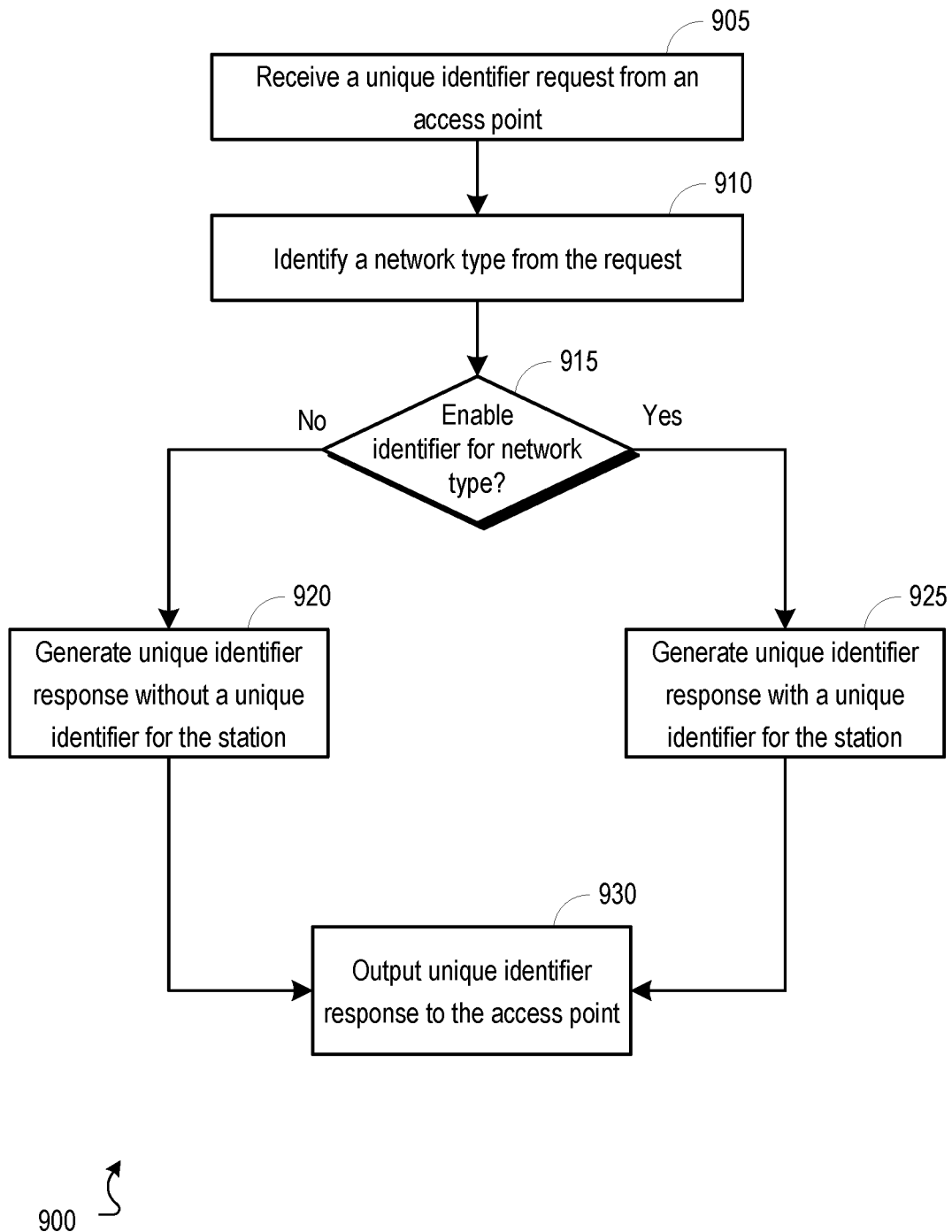
FIG. 9 is a flowchart illustrating an example process operable to facilitate generating a response to a unique identifier request.

FIG. 9 is a flowchart illustrating an example process 900 operable to facilitate generating a response to a unique identifier request. The process 900 can begin after a station (e.g., station 105 of FIG. 1) is associated with an access point (e.g., access point 115 of FIG. 1). Unique identifier response/request messages may be facilitated by a unique identifier exchange module 415 of FIG. 4 and/or a unique identifier exchange module 430 of FIG. 4. The process 900 can begin at 905, when a unique identifier request is received at a station 105, wherein the unique identifier request is output to the station 105 from an access point 115. When the station 105 has been associated with the access point 115, the access point 115 may generate and transmit a unique identifier request (e.g., unique identifier request 205 of FIG. 2A or 305 of FIG. 3A) to the station 105. The unique identifier request may include a request that the station respond with a unique identifier that is to be used by the access point for the station.

At 910, a network type may be identified from the unique identifier request. In embodiments, the unique identifier request may include an indication of the type of network provided by the access point 115 and with which the station 105 is currently associated (e.g., the indication may be provided within a requesting network type field 210 of FIG. 2A, a category field 310 of FIG. 3A, an ID query action field 315 of FIG. 3A, etc.). The unique identifier request may also include an indication as to whether the network is encrypted or unencrypted (e.g., the indication may be provided within an encryption enabled field 215 of FIG. 2A, a category field 310 of FIG. 3A, an ID query action field 315 of FIG. 3A, etc.). From the unique identifier request, the station 105 (e.g., the unique identifier exchange module 430) may determine the type of network (e.g., private network, public network, hotspot network, etc.) with which the station is associated and/or whether the network is encrypted or unencrypted.

At 915, a determination may be made whether a unique identifier generation feature is enabled for the identified network type and/or encryption status. For example, the station 105 (e.g., the unique identifier exchange module 430) may determine whether to provide the access point 115 with a unique identifier based upon the identification of the network type and/or the indication whether the network is encrypted or unencrypted. The station 105 may be configured with, for example, a filter to only allow the station 105 to provide an access point 115 with a unique identifier when the network with which the station 105 is associated is of a certain type and/or utilizing a certain encryption status or level. For example, the station 105 may be configured to only provide an access point with a unique identifier when the network with which the station is associated is a private network and/or an encrypted network.

If, at 915, the determination is made that the unique identifier generation feature is not enabled for the identified network type and/or encryption status, the process 900 may proceed to 920. At 920, a unique identifier response may be generated, wherein the unique identifier response does not include a unique identifier for the station. For example, the station may generate a unique identifier response having a value of a certain field (e.g., a response code field 225 of FIG. 2B or ID query response field 340 of FIG. 3B may be given a value of zero (0)) that indicates to the access point 115 that the station 105 is declining the option to provide the access point 115 with a unique identifier for the station 105. Alternatively, the station 105 may generate a unique identifier response that provides the access point 115 with a unique identifier for the station 105 but limits the use or duration for which the access point 115 may use/store the unique identifier (e.g., a use limitation may be included in an identifier duration field 240 of FIG. 2B or 355 of FIG. 3B or in some other field of the unique identifier response).

If, at 915, the determination is made that the unique identifier generation feature is enabled for the identified network type and/or encryption status, the process 900 may proceed to 925. At 925, a unique identifier response may be generated, wherein the unique identifier response includes a unique identifier for the station. For example, the station 105 may be configured to generate a unique identifier (e.g., random generation, preconfigured identifier, user input identifier, etc.) to be used by the access point 115. In embodiments, the station 105 may populate one or more other fields of the unique identifier response with values to indicate additional requirements/limitations of the use of the unique identifier by the access point 115 (e.g., identifier duration values, vendor specific options, etc.).

At 930, the unique identifier response generated by the station 105 may be output to the access point 115 from which the unique identifier request was received.

Figure 10:
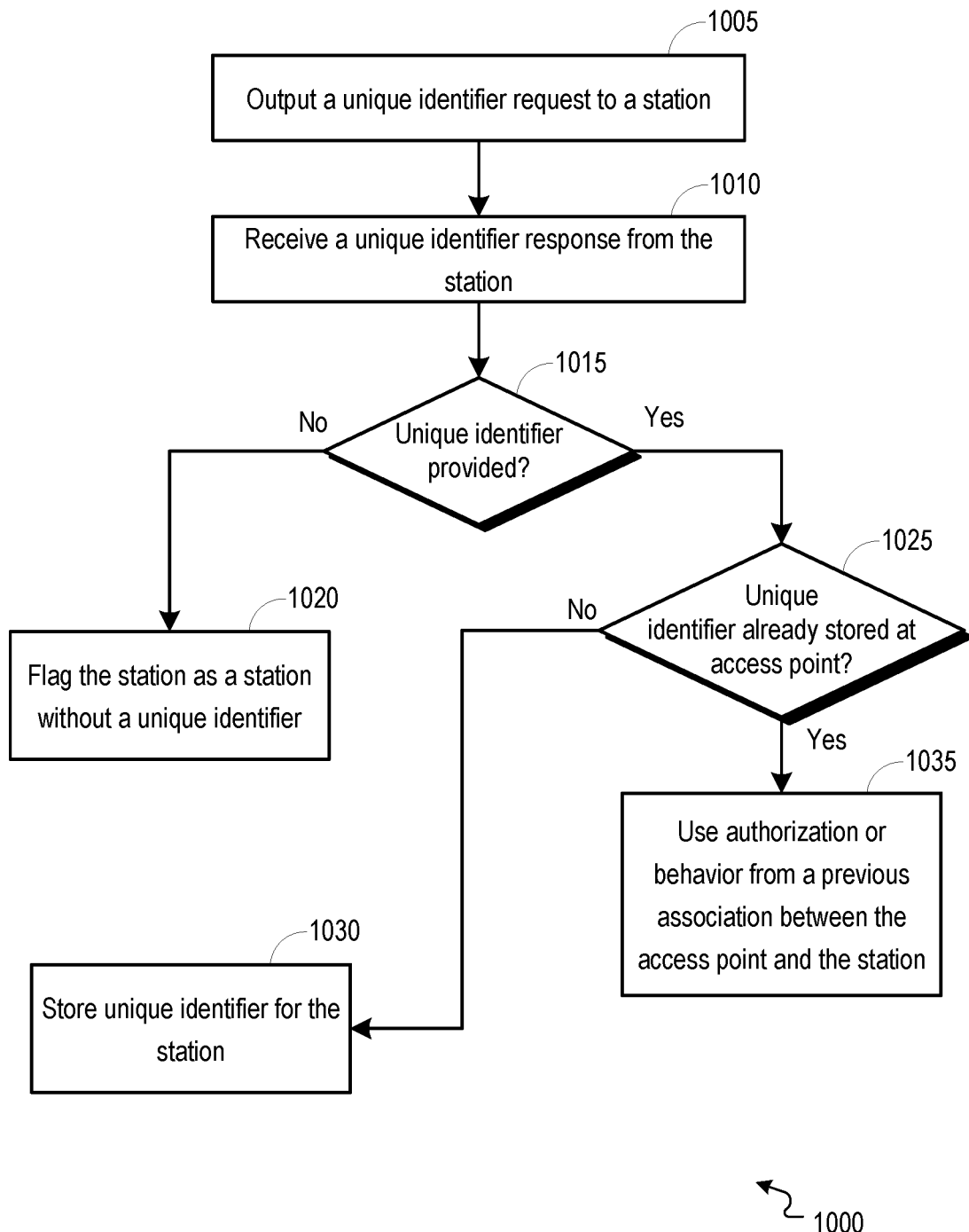
FIG. 10 is a flowchart illustrating an example process operable to facilitate managing a unique identifier recovered from a unique identifier response that is received from a station following a second or subsequent association between an access point and the station.

FIG. 10 is a flowchart illustrating an example process 1000 operable to facilitate managing a unique identifier recovered from a unique identifier response that is received from a station following a second or subsequent association between an access point and the station. The process 1000 can begin after a station (e.g., station 105 of FIG. 1) is associated with an access point (e.g., access point 115 of FIG. 1). The association between the access point 115 and the station 105 may be an association that occurs after a previous association between the access point 115 and the station 105 has ended. It should be understood that during the current association between the access point 115 and the station 105, the station 105 may be using a different identifier (e.g., rMAC) than the station 105 used during a previous association with the access point 115, but the station 105 may, during the current association, use the same unique identifier (e.g., the unique identifier provided in a unique identifier response) as the one used by the station 105 during a previous association with the access point 115. The unique identifier response/request messages may be facilitated by a unique identifier exchange module 415 of FIG. 4 and/or a unique identifier exchange module 430 of FIG. 4. The process 1000 can begin at 1005, when a unique identifier request is output to a station 105. When the station 105 has been associated with the access point 115, the access point 115 may generate and transmit a unique identifier request (e.g., unique identifier request 205 of FIG. 2A or 305 of FIG. 3A) to the station 105. The unique identifier request comprises a request that the station respond with a unique identifier that is to be used by the access point for the station.

At 1010, a unique identifier response may be received from the station. For example, the access point 115 may receive the unique identifier response (e.g., unique identifier response 220 of FIG. 2B or 325 of FIG. 3B) from the station 105, and the unique identifier response may include an indication that the station either is or is not providing a unique identifier that is to be used for the station. The indication may be provided within a response code field 225 of FIG. 2B or ID query response field 340 of FIG. 3B.

At 1015, a determination may be made whether the unique identifier response provides a unique identifier to be used for the station. In embodiments, the access point 115 may make this determination based upon whether a unique identifier is present within the unique identifier response or based upon whether the unique identifier response provides an indication whether a unique identifier is provided by the response.

If, at 1015, the determination is made that a unique identifier is not provided by the unique identifier response, the process 1000 may proceed to 1020. At 1020, the station 105 may be flagged as a station without a unique identifier. The access point may flag the station 105 as having declined or as being unable to provide a unique identifier other than an identifier that is already known (e.g., a MAC address of the station 105) to the access point 115. Alternatively, the access point 115 may simply do nothing in response to the determination that a unique identifier is not provided by the unique identifier response.

If, at 1015, the determination is made that a unique identifier is provided by the unique identifier response, the process 1000 may proceed to 1025. At 1025, a determination may be made whether the provided unique identifier is already stored at the access point 115. In embodiments, the access point 115 may have stored the unique identifier for the station 105 during a previous association between the station 105 and the access point 115, wherein the previous association has ended. For example, the unique identifier provided within the unique identifier response that is received by the access point 115 at 1005 may be the same unique identifier as one that was provided by the station 105 during a previous association with the access point 115 (e.g., a unique identifier provided within a unique identifier response that was received during a previous association between the access point 115 and the station 105).

If, at 1025, the determination is made that the unique identifier is not already stored at the access point, the process 1000 may proceed to 1030. At 1030, the access point 115 may store the unique identifier for the station 105. For example, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

If, at 1025, the determination is made that the unique identifier is already stored at the access point, the process 1000 may proceed to 1035. At 1035, the access point 115 may use authorization(s) and/or behavior(s) used during a previous association between the access point 115 and the station 105. For example, the access point 115 may use authorization(s) and/or behaviors, and/or enable one or more services or features that were used and/or enabled during a previous association between the access point 115 and the station 105. In embodiments, during the current association between the access point 115 and the station 105, the access point 115 may use authorization(s) and/or behaviors, and/or enable one or more services or features that were used and/or enabled during a previous association between the access point 115 and the station 105 without requesting corresponding authorization(s) and/or permission(s) from the station 105 during the current association between the access point 115 and the station 105.

Figure 11:
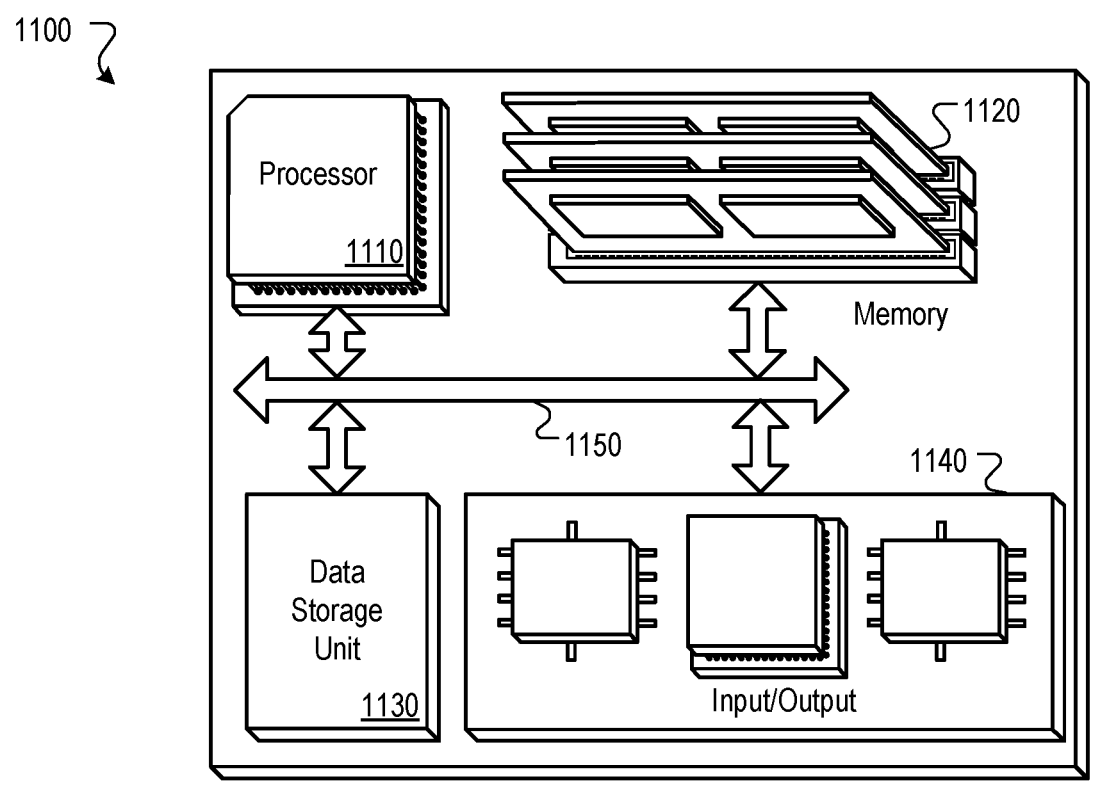
FIG. 11 is a block diagram of a hardware configuration operable to facilitate management of a unique identifier for a station.

FIG. 11 is a block diagram of a hardware configuration 1100 operable to facilitate management of a unique identifier for a station. The hardware configuration 1100 can include a processor 1110, a memory 1120, a storage device 1130, and an input/output device 1140. Each of the components 1110, 1120, 1130, and 1140 can, for example, be interconnected using a system bus 1150. The processor 1110 can be capable of processing instructions for execution within the hardware configuration 1100. In one implementation, the processor 1110 can be a single-threaded processor. In another implementation, the processor 1110 can be a multi-threaded processor. The processor 1110 can be capable of processing instructions stored in the memory 1120 or on the storage device 1130.

The memory 1120 can store information within the hardware configuration 1100. In one implementation, the memory 1120 can be a computer-readable medium. In one implementation, the memory 1120 can be a volatile memory unit. In another implementation, the memory 1120 can be a non-volatile memory unit.

In some implementations, the storage device 1130 can be capable of providing mass storage for the hardware configuration 1100. In one implementation, the storage device 1130 can be a computer-readable medium. In various different implementations, the storage device 1130 can, for example, include a hard disk device, an optical disk device, flash memory or some other large capacity storage device. In other implementations, the storage device 1130 can be a device external to the hardware configuration 1100. The storage device 1130, the memory 1120, or both can be referred to herein as a computer-readable medium.

The input/output device 1140 provides input/output operations for the hardware configuration 1100. In one implementation, the input/output device 1140 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card) for outputting video, voice, and/or data services to a station 105 of FIG. 1 (e.g., television, STB, computer, mobile device, tablet, telephone, wearable, etc.). In embodiments, the input/output device can include driver devices configured to send communications to, and receive communications from one or more networks (e.g., local network 110 of FIG. 1, broadband access network 120 of FIG. 1, WAN 125 of FIG. 1, etc.).

Figure 12:
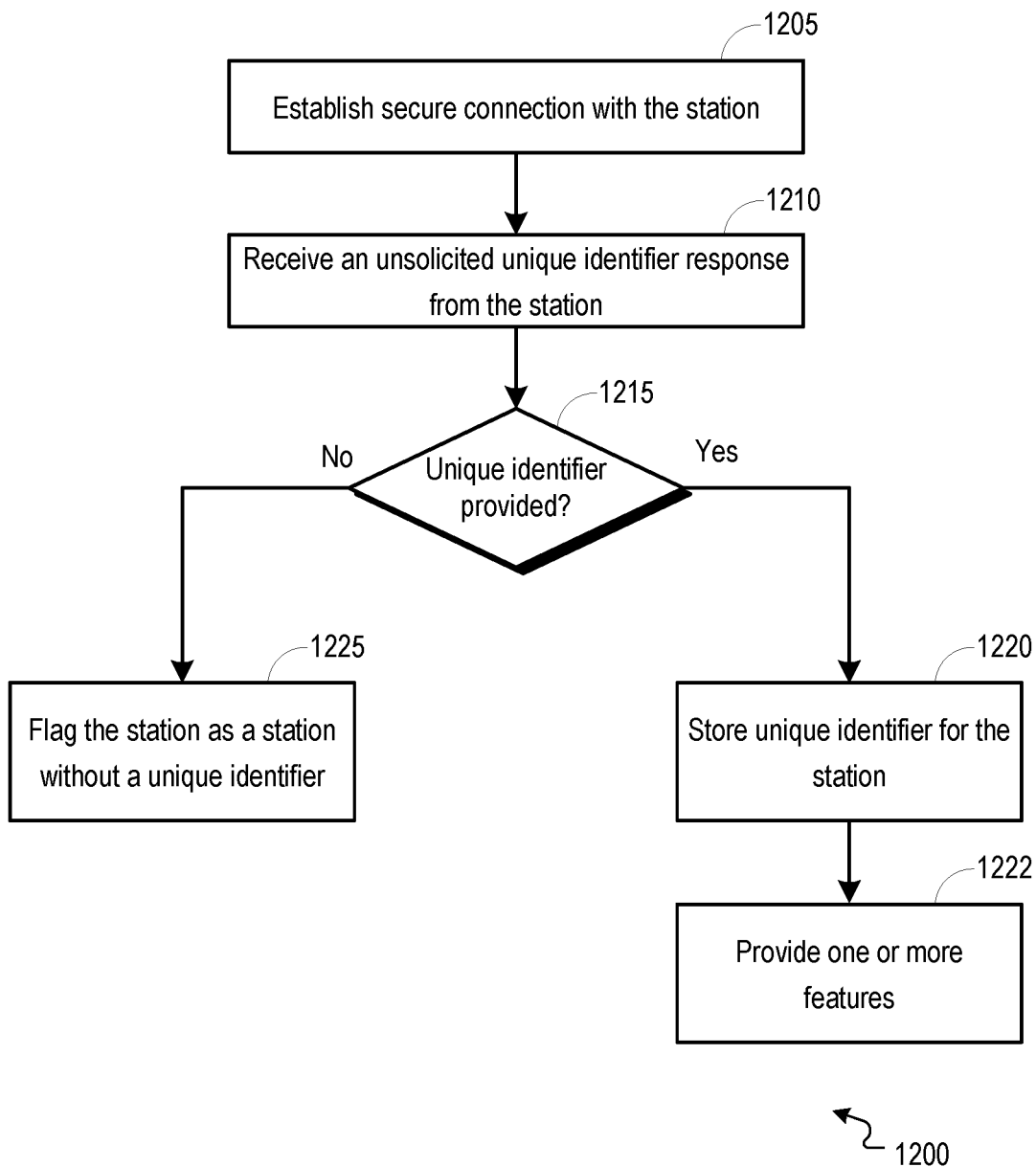
FIG. 12 is a flowchart illustrating an example process operable to facilitate receiving an unsolicited unique identifier response from a station.

FIG. 12 is a flowchart illustrating an example process 1200 operable to facilitate receiving an unsolicited unique identifier response from a station. The process 1200 begins prior to a station (for example, a station 105 of FIG. 1) being associated with an access point (for example, access point 115 of FIG. 1). The unique identifier response may be facilitated by a unique identifier exchange module 430 of station 105 of FIG. 4. The process 1200 can begin at 1205, when a secure connection (such as any of a secured protected link, secured communication path, secure tunnel, any other secure connection, or any combination thereof) is established between the access point and the station. Establishing the secure connection can comprise any of exchanging one or more encryption keys between the access point 115 and the station 105, a pre-association security negotiation (PASN) such that a PASN tunnel can be established between the access point 115 and the station 105, performing a robust secure network (RSN) association between the station 105 and the access point 115, or any combination thereof. In one or more embodiments, the station 105 can initiate the secure connection with the access point 115.

At step 1210, after the secure connection has been established, such as at step 1205, (for example, after the station has validated that the infrastructure (such as the access point or the network) is trusted or known and/or determined unilaterally that a unique identifier for the station is available or stored at the station, after establishing a PASN tunnel, any other type of secure connection, or any combination thereof) or after establishing a secure connection via an association (for example, an RSN association), the access point device can receive an unsolicited unique identifier response (for example, a unique identifier response 220 of FIG. 2B or 325 of FIG. 3B) from the station via the secure connection. The unique identifier response comprises a unique identifier, for example, any of a universal unique identifier (UUID), a random number, a pseudorandom number, a preconfigured identifier (such as an identifier that is stored on or otherwise configured for the station 105, including but not limited to an identifier assigned by a system administrator, a membership identifier, an employee identifier, any other identifier unique for a business or entity, or any combination thereof), or any combination thereof, that is to be used by the access point for the station. In one or more embodiments, the station can determine that the unique identifier of or associated with the station should be sent to the access point device based on a network parameter. Sending the unique identifier over the secure connection ensures that the unique identifier is not intercepted by an unauthorized, malicious, or otherwise unintended device, network, or system.

For example, a network parameter can comprise a network identifier or information associated with the establishment of the secure connection. The station can identify the network indicated by the network identifier and then confirm or verify that the network is actually the network indicated by the network identifier (for example, not a spoofing attempt) based on the ability to establish the secure connection. As an example, a user with a station can transition to a particular network location, such as a store with a network identifier of "STORE-A NETWORK". The station can detect that the network (or the Wi-Fi connection) claims to be the network associated with the particular network location (for example, "STORE-A NETWORK"). The station can confirm that the network identified as "STORE-A NETWORK" is correct or not subject of a vicious or malicious activity as part of a validation, such as by performing PASN. The station can send a unique identifier associated with the user and the particular network location (such as a store shopper identifier number) to the network so that the user can be provided with an enhanced or improved network experience, for example, so that the station can receive notices (such as coupons) customized for the user, any other service or feature, or any combination thereof.

Steps 1215, 1220, and 1225 are similar to or the same as steps 515, 520, and 525 as discussed with reference to FIG. 5. At step 1222, the access point can provide one or more features (such as one or more services) associated with the received unique identifier from the station. For example, the unique identifier exchange module 415 of the access point 115 can facilitate the use of one or more unique identifiers so as to enable or disable one or more features provided to corresponding one or more stations 105. The one or more features can comprise any of one or more services provided by a business, an entity, and/or a network, access to a particular network (such as a public network, a private network, a secured network, a password controlled network, etc.), access to one or more benefits associated with a business or entity, receipt of push notices or messages (such as advertisements, coupons, rewards, rebates, certificates, and/or subscriptions), any other type of notice, message, or alert, or any combination thereof. As an example, the access point 115 can provide one or more benefits associated with a business (such as a retail business or an online business) or entity, for example, one or more frequent shopper benefits to a user of a station 105 based on the unique identifier received via the unsolicited unique identifier response from the station 105. As an alternative, if no unique identifier is received by the access point 115, the access point 115 can disable a service or prevent access to a service by a user of the corresponding station 105.

In one or more embodiments, step 1222 can occur prior to or after associating the station 105 to access point 115 or even if no association ever occurs. For example, the network or access point can determine that the station has been transitioned to within a range or a proximity of the network or access point such that the network can push one or more notices (such as a notice customized for the user of the station, the station, or both) to the station using one or more network protocols, one or more types of digital communications, etc. As an example, when the user transitions the station to within range of the STORE-A NETWORK, customized coupons can be sent to the station via a text message even though the station is not associated with the network or the user can be identified as present at the particular network location, such as the user is put on a list (for example, a seating waiting list at a restaurant). As another example, the user can transition the station to a network location that comprises a router provided by an internet service provider, such as a home, a residence, an office, etc., that has a private Wi-Fi network and a public/community Wi-Fi network. This access point or network does not determine the identity of the user and/or the station until the station provides the unique identifier. Once the router receives the unique identifier, the access point or network can determine the services or features associated with the station, for example, whether certain features or services are enabled or disable, or allowed or disallowed, for the station. The access point or network can determine that the station is associated with a user or a user profile. The user or the user profile can be associated with one or more features such that the one or more features provided by the access point to the station is based on the user or the user profile. The access point can provide one or more features based on this determination that the station is associated with a user profile such that the access point can enforce different policies against the station based on the user profile. For example, the access point can determine that the station is associated with a resident or employee and based on this determination the access point can allow or permit the station to connect to the private network instead of the public network.

In one or more embodiments, after associating the access point 115 and the station 105, the access point 115 can provide network information to the station 105. For example, the network information can comprise information specifying a network or a network access for the station 105. In one or more embodiments, the network information can be provided prior to or without associating the access point 115 and the station 105.

In one or more embodiments, after step 1210, any one or more of steps 715, 720, 725, 730, and 735 of FIG. 7, steps 815, 820, 825, 830, 835, 840, and 845 of FIG. 8, and steps 1015, 1020, 1025, 1030, 1035 of FIG. 10 can be performed. While the steps of FIGS. 5-10 and 12 are presented in a certain order, the present disclosure contemplates that any one or more steps can be performed simultaneously, substantially simultaneously, repeatedly, or not at all (omitted).

Figure 13:
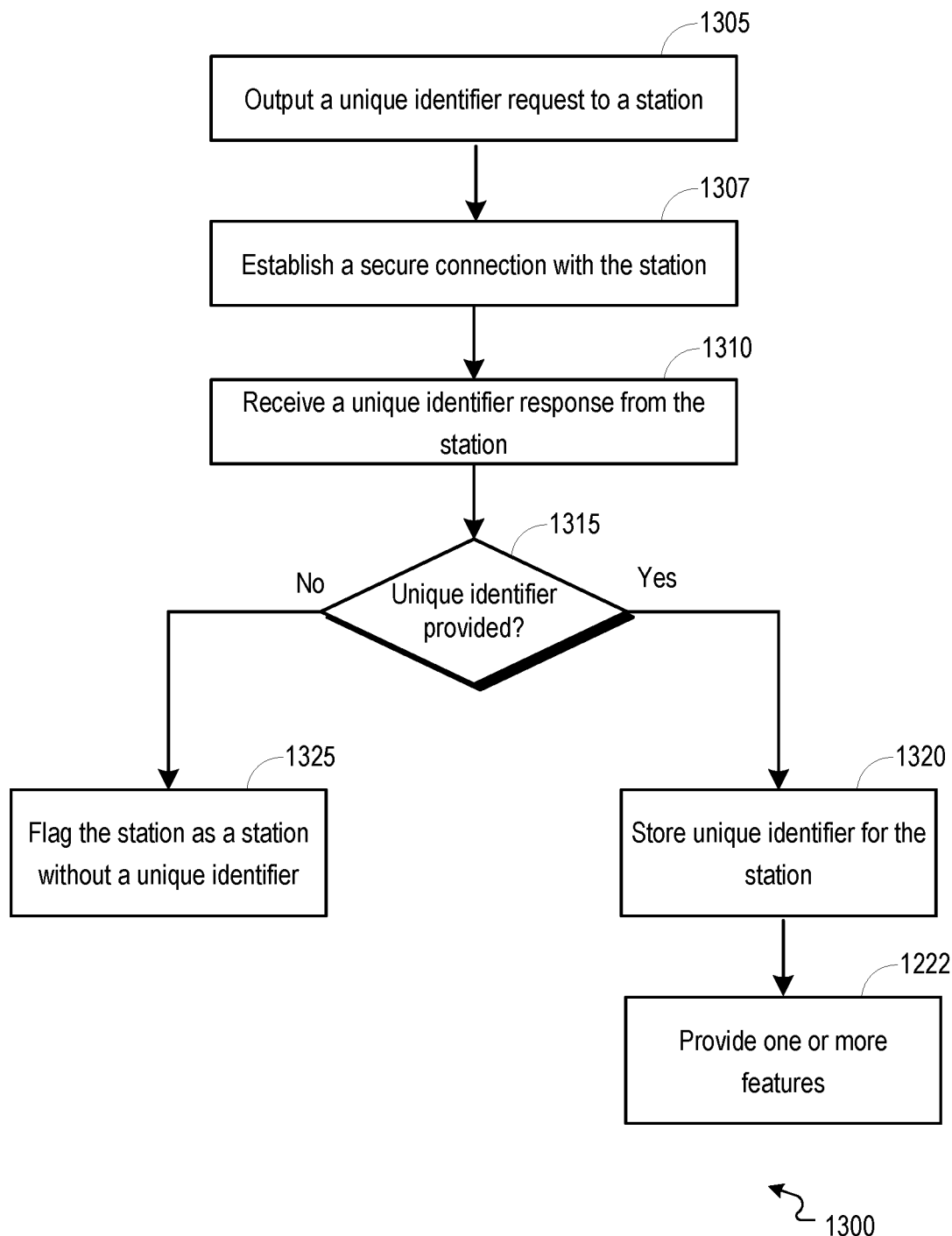
FIG. 13 is a flowchart illustrating an example process operable to facilitate the communication of a unique identifier response via a secure connection.

FIG. 13 is a flowchart illustrating an example process 1300 operable to facilitate communicating a unique identifier via a secure connection. The process 1300 begins prior to a station (for example, a station 105 of FIG. 1) associating with an access point (for example, access point 115 of FIG. 1). The unique identifier response and/or unique identifier request may be facilitated by a unique identifier exchange module 415 of FIG. 4 and/or a unique identifier exchange module 430 of station 105 of FIG. 4. The process 1300 can begin at 1305, when a unique identifier request is output to a station 105 from an access point 115.

At step 1307, a secure connection (such as any of a secured protected link, secured communication path, secure tunnel, any other secure connection, or any combination thereof) is established between the access point and the station. For example, a secure tunnel, such as a pre-association security negotiation (PASN) tunnel, can be established between the access point and the station. For example, the station 105 can determine based on the unique identifier request from the access point 115 that a secure connection should be established or is required between the access point 115 and the station 105 so that a unique identifier associated with the station 105 can be sent to the access point 115 via the secure connection. Based on this determination, the station 105 can initiate the secure connection with the access point 115 and once the secure connection is established the station 105 can send the unique identifier to the access point 115. Sending the unique identifier over the secure connection ensures that the unique identifier is not intercepted by an unauthorized, malicious, or otherwise unintended device, network, or system.

At step 1310, prior to the station 105 associating with the access point 115 and after the secure connection has been established (for example, after the station has validated that the infrastructure (such as the access point or the network) is trusted or known and/or determined unilaterally that a unique identifier for the station is available or stored at the station), the access point can receive the unique identifier response (for example, a unique identifier response 220 of FIG. 2B or 325 of FIG. 3B) from the station via the secure connection, for example, as discussed with reference to step 120 of FIG. 12. The unique identifier response comprises a unique identifier that is to be used by the access point for the station. In one or more embodiments, the station can determine that the unique identifier of or associated with the station should be sent to the access point based on the unique identifier request from the access point 115, the establishment of the secure connection, or both.

Steps 1315, 1320, and 1325 are similar to or the same as steps 515, 520, and 525 as discussed with reference to FIG. 5. At step 1322, the access point can provide one or more features associated with the received unique identifier from the station, for example, as discussed with reference to step 1222 of FIG. 12. As an example, the unique identifier exchange module 415 of the access point 115 can facilitate the use of one or more unique identifiers so as to enable or disable one or more one or more features (such as one or more services) provided to corresponding one or more stations 105. As an example, the access point 115 can provide one or more benefits associated with a business (such as a retail business or an online business) or entity, for example, one or more frequent shopper benefits, to a user of a station 105 based on the unique identifier received via the unsolicited unique identifier response from the station 105.

As an alternative, if no unique identifier is received by the access point 115, the access point 115 can disable a service or prevent access to a service by a user of the corresponding station 105. For example, at step 1322, the access point 115 can associate the station 105 with the access point 115, determine that the station 105 should be within the network and facilitate connectivity to the network, determining that the station 105 should not be within the network, provide access to a service or feature associated with an application or a network resource, such as a frequent shopper service, provide an enabled or disabled access to any one or more one or more features (such as one or more services), or any combination thereof.

In one or more embodiments, after step 1310, any one or more of steps 715, 720, 725, 730, and 735 of FIG. 7, steps 815, 820, 825, 830, 835, 840, and 845 of FIG. 8, and steps 1015, 1020, 1025, 1030, 1035 of FIG. 10 can be performed. While the steps of FIGS. 5-10 and 12-13 are presented in a certain order, the present disclosure contemplates that any one or more steps can be performed simultaneously, substantially simultaneously, repeatedly, or not at all (omitted).

Figure 14:
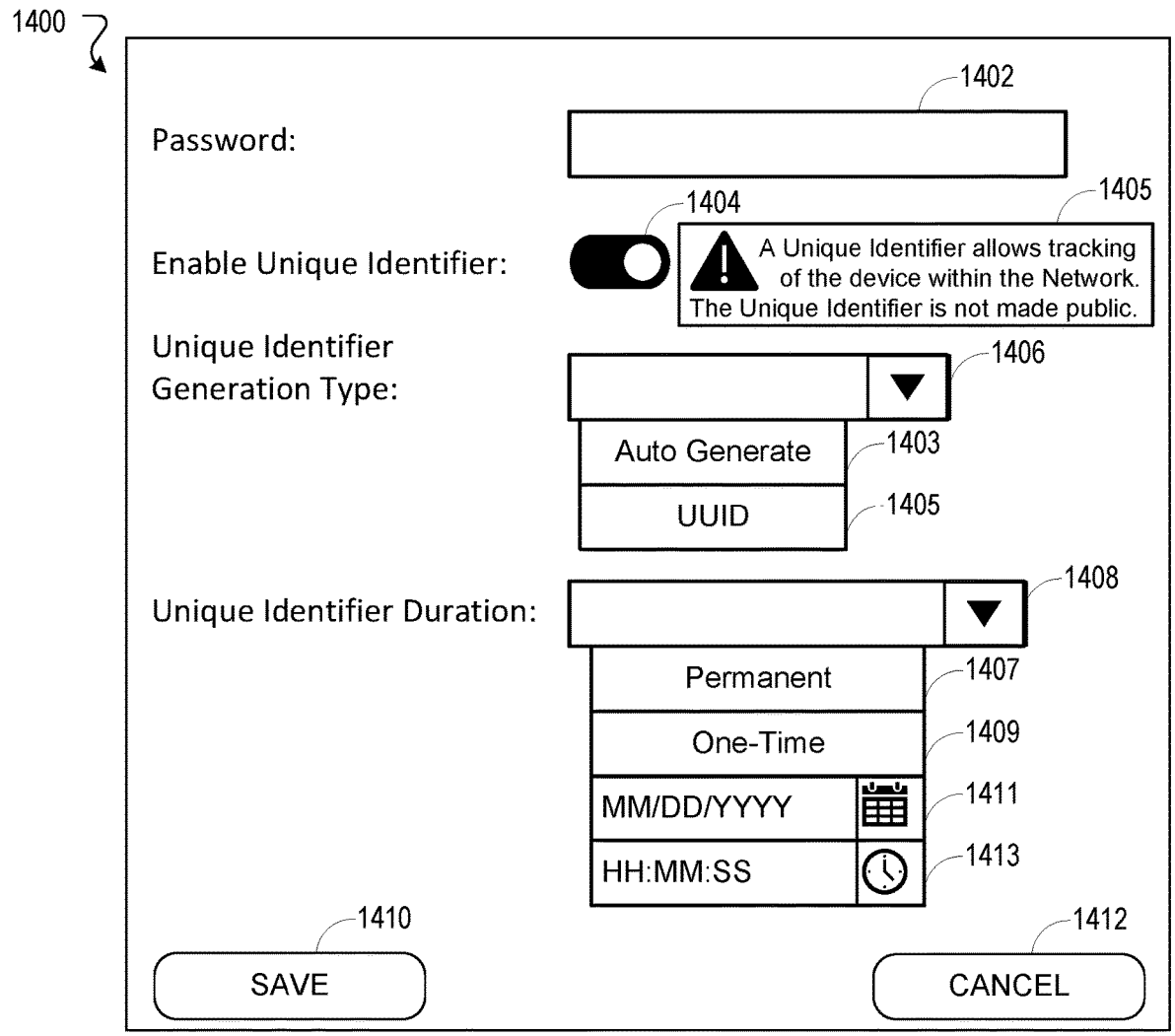
FIG. 14 is a diagram of an example unique identifier user interface.

FIG. 14 is a diagram of an example unique identifier user interface 1400, such as the unique identifier user interface 450 discussed with reference to FIG. 4. The unique identifier user interface 1400 can be provided to an I/O device 455, such as a display device. The unique identifier interface 1400 can comprise an interface for providing to and/or receiving from an I/O device 455 one or more UID C-PARAIVIS 470. For example, the unique identifier interface 1400 can be provided to a display device and the unique identifier interface 1400 can receive one or more inputs via an input device, such as one or more inputs from a user. The unique identifier user interface 1400 can comprise one or more fields associated with one or more UID C-PARAMS 470, one or more other fields associated with a unique identifier for the station 105, or both. The one or more fields can comprise any of a network password field 1402 (for example, a passphrase required to join the network), a unique identifier setting field 1404, a unique identifier setting message field 1405, a unique identifier generation type field 1406, a unique identifier duration field 1408, a save configuration field 1410, a cancel configuration field 1412, any other field associated with configuration of a unique identifier for a station 105, or any combination thereof.

The network password field 1402 can be associated with a network password that has been received and/or previously stored by the station 105. In one or more embodiments, the network password can be stored as a network password 479 of the one or more UID C-PARAMS 470. The network password field 1402 can receive as an input a password associated with a network. For example, a network password can be required for a station 105 to access one or more network resources associated with a network, for example, to access the Internet.

The unique identifier setting field 1404 can be associated with a unique identifier setting 471 of the one or more UID C-PARAMS 470. The unique identifier setting field 1404 can indicate or allow the setting of a status of the unique identifier setting 471. For example, the unique identifier setting field 1404 can indicate that the status of the unique identifier setting 471 is enabled (as indicated in FIG. 14), such that a unique identifier is available or is permitted or allowed to be generated for the station 105, or disabled, such that a unique identifier is not available or is not permitted or not allowed to be generated for the station 105. The value of the unique identifier setting 471 can be binary, for example, the unique identifier setting 471 can comprise a binary "1"

(set or enable) to indicate that a unique identifier is available or is permitted or allowed to be generated for the station 105 or a binary "0" (not set or disabled) to indicate that a unique identifier is not available or is not permitted or not allowed to be generated for the station 105. In one or more embodiments, when the unique identifier setting field 1404 is transitioned from a status of enabled to a status of disabled, any stored unique identifier associated with the station 105, a particular network, or both, is deleted or removed, for example, any one or more of the one or more UID C-PARAMS 470 associated with the unique identifier, a particular network, or both are deleted from a unique identifier database 460. As an example, if the unique identifier setting field 1404 indicates a status of enabled (for example, the user sets the unique identifier setting field 1404 and/or the corresponding unique identifier setting 471 is set), when the access point 115 requests a unique identifier from the station 105, the unique identifier that is stored (for example, unique identifier 480) or that is generated is sent to the Wi-Fi radio of the station 105 for inclusion into an action frame, for example, a unique identifier response action frame and if the unique identifier setting field 1404 indicates a status of disabled (for example, the user unsets or toggles the unique identifier setting field and/or the corresponding unique identifier setting 471 is not set), a zero-length or NULL string is used as the unique identifier for the unique identifier response action frame.

A unique identifier setting message field 1405 can be positioned at or near the unique identifier setting field 1404 or at any other location. The unique identifier setting message field 1405 can indicate any of a warning, an alert, any other information, or any combination thereof associated with the unique identifier setting field 1404. For example, the unique identifier setting message field 1405 can comprise any of a text string, one or more symbols, a character, an icon, a picture, a graphic, any other image or depiction, or any combination thereof. As an example, the unique identifier setting message field 1405 can inform a user with the message "A Unique Identifier allows tracking of the device within the Network. The Unique Identifier is not made public." as indicated in FIG. 14.

The unique identifier generation type field 1406 can be associated with a unique identifier generation type 477 of the one or more UID C-PARAMS 470. The unique identifier generation type field 1406 can receive as an input an indicator as to the type of generation of the unique identifier when generation of a unique identifier is required and/or permitted, for example, when the status of the unique identifier setting 471 is enabled or set. For example, the unique identifier generation type field 1406 can indicate that a unique identifier can be generated automatically (Auto Generate 1403, for example based on any of a random number generator, a pseudorandom number generator, any other automatic generation algorithm, or any combination thereof) or by using a universally unique identifier (UUID 1405). While FIG. 14 illustrates certain types of generation of a unique identifier, the present disclosure contemplates that various types of generation can be utilized. For example, the type of generation selected by a user from the unique identifier generation type field 1406 can indicate a unique identifier should be generated that is of a character length associated with the type of generation, such as more than eight characters, a maxim of thirty-six characters, any number of characters between eight and thirty-six, or any other number of characters, and that is Unicode transformation format (UNI)-8 encoded. As an example, if a user selects UUID 1405, then a unique identifier can be generated that includes thirty-six characters. In one or more embodiments, the unique identifier generation type field 1406 allows a user to enter a text-string (for example, any of a user-determined, preconfigured, predetermined identifier, or any combination thereof text string) via the I/O device 455 as the unique identifier associated with the station 105, the network or network connection, or both. Based on the unique identifier generation type (such as the selected entry of the unique identifier generation type field 1406), the unique identifier associated with a particular network or SSID can comprise any of a universal unique identifier, a random number, a pseudorandom number, a preconfigured identifier, certificate, or any combination thereof. While FIG. 14 illustrates two different generation types, the present disclosure contemplates that any one or more generation types can be provided or used, for example, the generation type 477 can indicate that any of a hexadecimal value, a text-based value, a certificate, or any combination thereof can be used to generate the unique identifier.

The unique identifier duration field 1408 can be associated with a unique identifier duration 475 of the one or more unique identifier configuration parameters 470. The unique identifier duration field 1408 can receive as an input an indicator as to the duration that a unique identifier associated with the station 105 is valid or active. For example, the unique identifier duration field 1408 can comprise one or more duration types, such as any of a permanent duration 1407 (for example, the unique identifier does not expire, remains active and/or valid, remains constant unless modified by a user), a one-time duration 1409 (for example, the unique identifier is valid only during any of an association, a session, a connection, or any combination thereof, may not be stored in non-volatile memory, or both), a date range 1411 (for example, the unique identifier is valid for a selected date or range of dates), a time range 1413 (for example, the unique identifier is valid for a selected timeframe or range of times), any other duration, or any combination thereof.

The unique identifier user interface 1400 can also include selections or inputs that allow for the cancelling (a cancel configuration field 1412), saving (a save configuration field 1410), or both of the information input at the one or more fields. The save configuration field 1410 when selected causes information of the unique identifier user interface 1400, such as the one or more configuration parameters 470 associated with one or more fields, to be stored or otherwise saved in a memory, for example, a unique identifier database 460. By saving the one or more UID C-PARAMS 470, the unique identifier 480 can be added to any subsequent transmissions to the access point 115 from the station 105, for example, in an action frame, such as a unique identifier response action frame. Such transmissions can occur asynchronously, if the station 105 has already joined the network, or in response to a unique identifier request action frame from the access point 115. If the cancel configuration field 1412 is selected, no information from any fields are saved or stored, for example, no modifications or alterations are made to the associated one or more UID C-PARAMS 470 and/or the associated UID C-PARAMS 470 are not stored.

Figure 15:
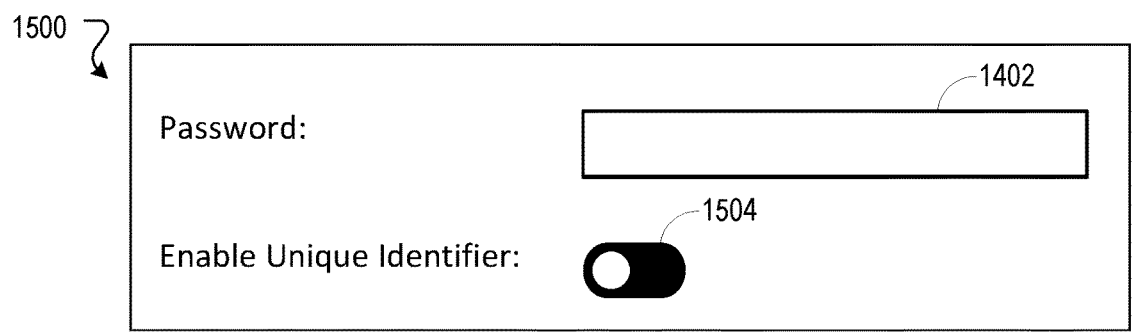
FIG. 15 is a diagram of an example unique identifier user interface.

FIG. 15 is a diagram of an example unique identifier user interface 1500, such as the unique identifier user interface 1400 as discussed with reference to FIG. 4. FIG. 15 illustrates a unique identifier setting field 1504 that is similar to the unique identifier setting field 1404 except that the unique identifier field 1504 is set to a status of disabled. FIGS. 14 and 15 illustrate a unique identifier user interface that is configured based on the status of the unique identifier setting as indicated by the unique identifier setting fields 1404 and/or 1504 and a determination that the network supports use of the unique identifier.

Figure 16:
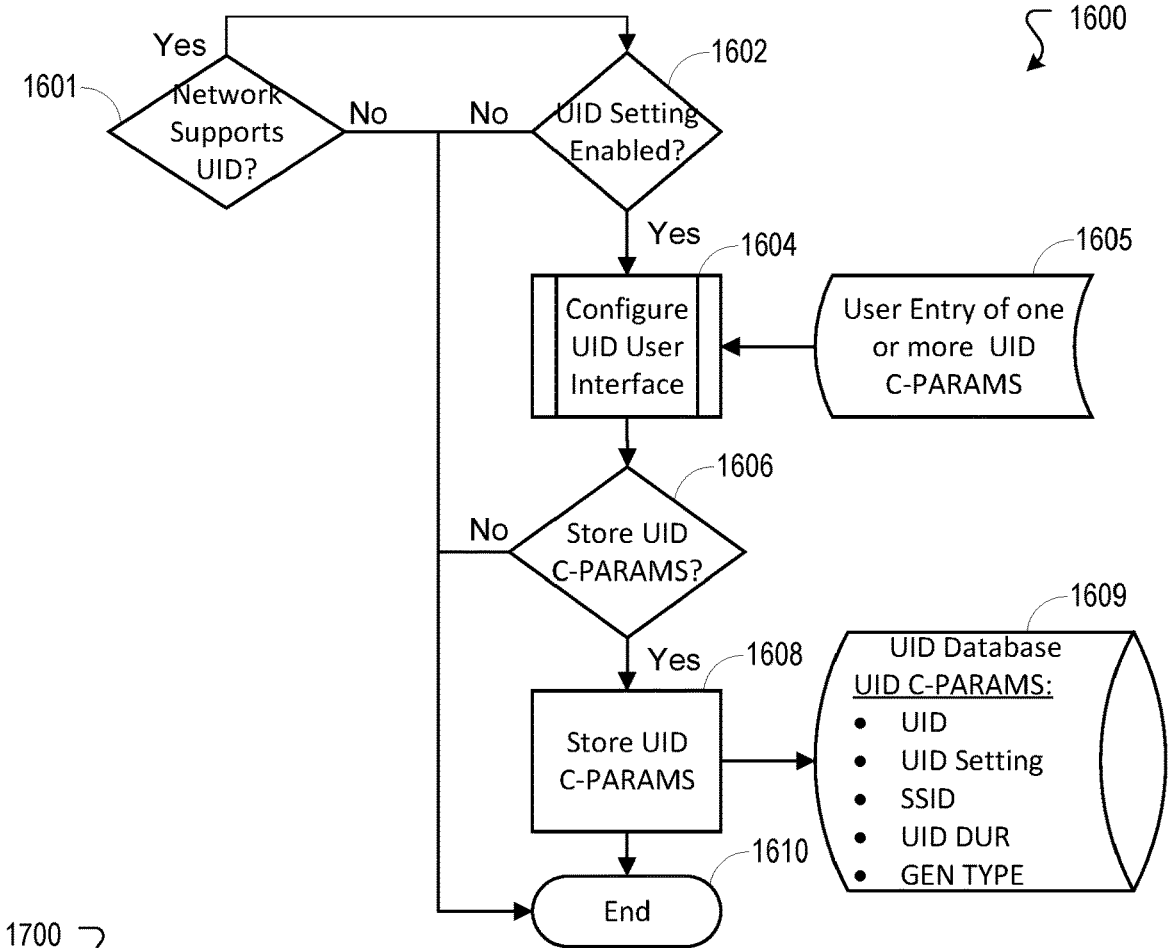
FIG. 16 is a flowchart illustrating an example process operable to configure a unique identifier user interface.

FIG. 16 is a flowchart illustrating an example process operable to configure a unique identifier user interface 1600. For example, a station 105 connected to an access point 115 in a network environment that comprises a network (such as a wireless network 110), for example, can comprise a processor that executes one or more computer-readable instructions stored in a memory so as to perform one or more steps of FIG. 16. At step 1601, the process begins with at station 105 determining if the network supports using or use of a unique identifier associated with the station 105. If the network does not support the use of a unique identifier the process ends at step 1610.

If the network does support the use of a unique identifier, then at step 1602, the station 105 determines if the station 105 has enabled use of a unique identifier, for example, that a unique identifier setting 471 of one or more UID C-PARAMS 470 is enabled. As an example, capabilities information as to whether an access point 115, a network, or both supports use of a unique identifier can be indicated by a capabilities bit or one or more elements sent from the access point 115 to the station during establishment of a connection, such as an association, with the station 105. For example, a radio of the station 105 can receive this capabilities information from the access point 115 (such as in one or more beacon frames, a probe response frame, any other frame, or any combination thereof) and store the capabilities information in a memory associated with the station 105. One or more subsequent actions can then be taken by the station 105 based on the retrieving this information (capabilities information that was previously advertised by the network and stored by the station 105). As an example, an access point 115 or WLAN can communicate capabilities information in a capability bit that indicates support of a unique identifier and the station 105 can then provide to the user associated with the station a unique identifier user interface 1400 that is configured to allow the user to toggle (enable and/or disable) or otherwise configure a unique identifier for use by the station 105 to uniquely identify the station 105 within the network, for example, so than one or more access points 115 can track the station 105 throughout the network. If the access point 115 or WLAN does not indicate such a capability or provide such capabilities information, then the station 105 can remove the ability of the user to configure a unique identifier. If the station 105 does not have unique identifier enabled (for example, the unique identifier setting 471 is not enabled and/or the capabilities information received from the network and/or the access point 115 does not indicate support for a unique identifier), the process ends at step 1610.

If at step 1602, the station 105 determines that use of a unique identifier is enabled (for example, the unique identifier setting 471 is enabled), the station 105 can at step 1604 configure a unique identifier user interface, such as unique identifier user interface 1400. The unique identifier user interface can be configured and provided to an I/O device 455, such as displaying the unique identifier user interface at a display device. In one or more embodiments, the configuring the unique identifier user interface comprises retrieving one or more previously stored UID C-PARAMS 470 associated with a unique identifier, for example, so as to allow modifications to the one or more previously stored UID C-PARAMS 470. The one or more previously stored UID C-PARAMS 470 are provided to the unique identifier user interface. As indicated at step 1605, configuration of the unique identifier user interface can comprise receiving a user entry of one or more UID C-PARAMS 470 as discussed with reference to FIG. 14. Receiving the one or more UID C-PARAMS 470 via the unique identifier user interface can comprise creating one or more UID C-PARAMS 470, updating the one or more previously stored UID C-PARAMS 470 with the one or more received inputs (such as one or more UID C-PARAMS 470) via the unique identifier user interface, or both.

At step 1606, the station 105 determines if the one or more UID C-PARAMS 470 associated with the unique identifier user interface should be stored. For example, a user can make a selection (for example, select the save configuration field 1410 as discussed with reference to FIG. 14) that indicates that any one or more UID C-PARAMS 470 received or otherwise provided via the unique identifier user interface should be stored. If the station 105 determines that the UID C-PARAMS 470 should not be stored (for example, select the cancel configuration field 1412 as discussed with reference to FIG. 14), the process ends at step 1610.

If the station 105 determines that the one or more UID C-PARAMS 470 should be stored, then at step 1608 the station 105 stores the one or more UID C-PARAMS 470. Storing the one or more UID C-PARAMS 470 can comprise creating one or more UID C-PARAMS 470, modifying, altering, changing, otherwise updating one or more previously stored UID C-PARAMS 470, or both that are associated with any of a unique identifier 480, an SSID 473, any other network or network identifier, or any combination thereof. For example, a user can via the unique identifier user interface change one or more UID C-PARAMS 470, such as change the unique identifier duration 475 associated with a unique identifier 480 or an SSID 473 or can cause the generation of a unique identifier 480 based on the one or more configuration parameters 470 received via the unique identifier user interface, with the change being stored, for example, in a database 460, at step 1609. While only one unique identifier 480 is associated with any particular SSID 473, the present disclosure contemplates that a station 105 can be transitioned to or otherwise used in one or more different network basic service sets (BSSs).

Figure 17:
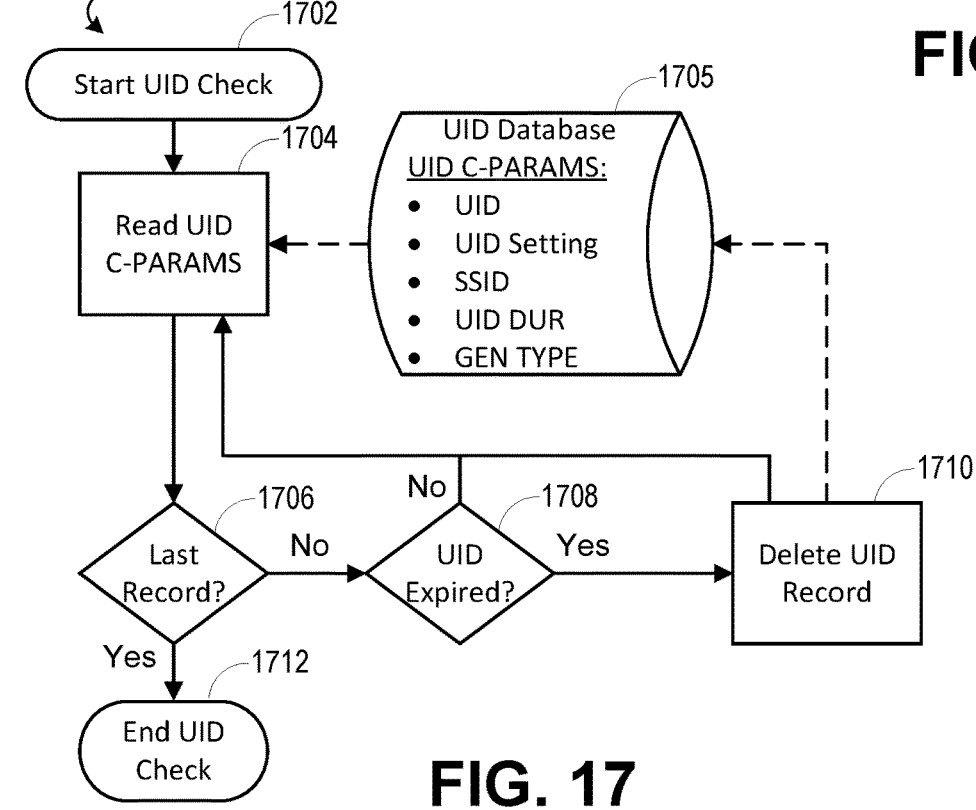
FIG. 17 is a flowchart illustrating an example process operable to check a status of a unique identifier.

FIG. 17 is a flowchart illustrating an example process operable to determine or check a status of a unique identifier. At step 1702, the station 105 starts a process operable to determine or check a status of the unique identifier, for example, the station 105 can comprise a processor that executes one or more computer-readable instructions stored in a memory so as to perform one or more steps of FIG. 17. For example, the station 105 can any of periodically, at a timed interval, expiration of a timer, an alert (such as a semaphore), any other basis, or any combination thereof, determine or check a status of unique identifier associated with a network, such as associated with an SSID of a wireless network.

At step 1704, the station 105 reads one or more UID C-PARAMS 470. For example, the station 105 can request one or more UID C-PARAMS 470 associated with a unique identifier 480, a network (such as an SSID 473), or both from a unique identifier database 460. At step 1705, the unique identifier database 1705 can send one or more UID C-PARAMS 470 to the station 105.

At step 1706, the station 105, can determine if all UID C-PARAIVIS 470 (for example, the last record in a list) have been received. If the last record has been received the process ends at step 1712. If not the last record, then the station 105 at step 1708 determines if the unique identifier 480 associated with the read UID C-PARAMS 470 from step

1704 has expired based on at least one of the one or more UID C-PARAMS 470, for example, a unique identifier duration 475. If the unique identifier 480 has not expired, the process continues at step 1704 so as to retrieve one or more additional UID C-PARAMS 470 associated with a different unique identifier 480, a different network, such as a different SSID 473, or both.

If the station 105 determines that the unique identifier 480 has expired at step 1708, then the process continues to step 1710 where the station 105 deletes the one or more UID C-PARAMS 470 (for example, the record read from the unique identifier database 460 at step 1704) from the unique identifier database 460. For example, the station 105 can send a delete query to the unique identifier database 460. As an example, if an access point 115 subsequently requests from the station 105 the unique identifier associated with a network that has been deleted, then station 105 does not return a unique identifier for the network, for example, a NULL or zero-length unique identifier shall be returned in the unique identifier response action frame to the access point 115.

Figure 18:
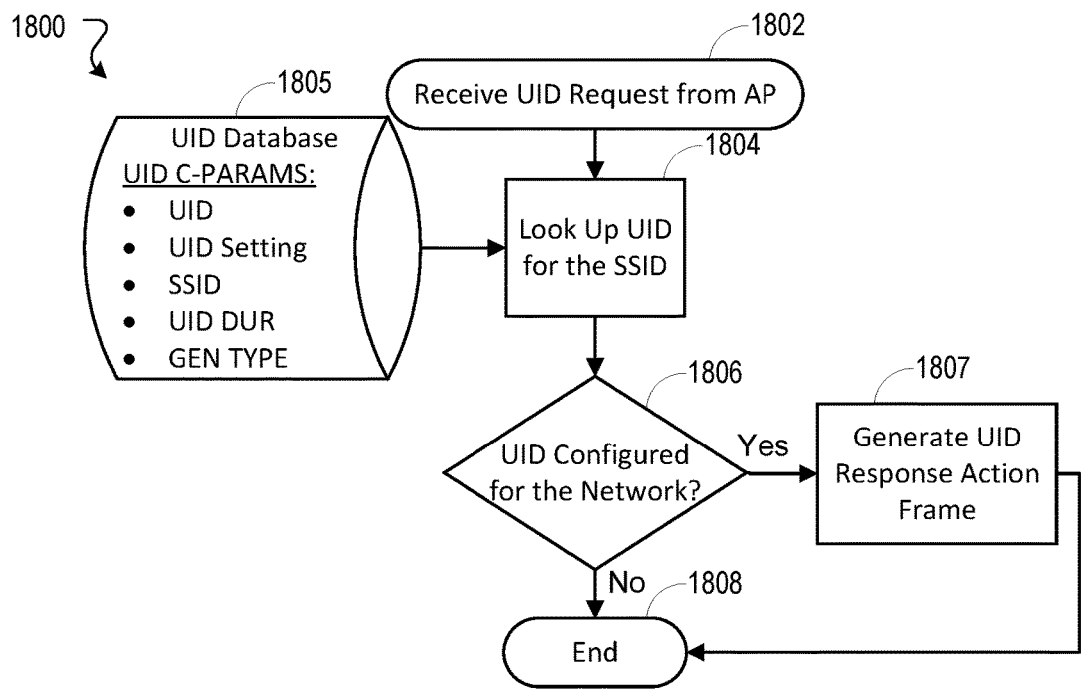
FIG. 18 is a flowchart illustrating an example process operable to generate a unique identifier response action frame.

FIG. 18 is a flowchart illustrating an example process operable to generate an action frame, for example, a unique identifier response action frame. As an example, a station 105 starts a process operable to generate a unique identifier associated with the station 105 based on at least one of one or more unique identifier configuration parameters, for example, the station 105 can comprise a processor that executes one or more computer-readable instructions stored in a memory so as to perform one or more steps of FIG. 18. At step 1802, the station 105 receives a unique identifier request from an access point 115, for example, a unique identifier request action frame. The unique identifier request action frame can comprise any of information associated with the network, such as a wireless network, an SSID associated with the network, any other information, or any combination thereof.

At step 1804, the station 105 looks up a unique identifier associated with the network, an SSID, or both. For example, the station 105 can use the information received in a unique identifier request action frame to determine if a corresponding one or more UID C-PARAMS 470 exist for the corresponding network, SSID, or both. In one or more embodiments, the station 105 can send a query or request to a unique identifier database 460 for one or more UID C-PARAMS 470. At step 1805, the unique identifier database 460 can provide to the station 105 a response to the query that indicates that one or more UID C-PARAMS 470 do not correspond to the network, the SSID, or both (such as a NULL or empty set) or can provide a response that comprises one or more UID C-PARAMS 470 that correspond to the network, the SSID, or both. For example, a comparison can be made of an SSID provided in the unique identifier request action frame to one or more SSIDs 473 stored in the unique identifier database 460 and associated with one or more UID C-PARAIVIS 470).

At step 1806, the station 105 can determine if a unique identifier has been previously configured for the station 105. For example, the station 105 can determine based on the query sent to the unique identifier database 460 at steps 1804 and 1805 if the SSID in the unique identifier request action frame matches an SSID 473 associated with one or more UID C-PARAMS 470. If a unique identifier 480 is not returned (for example, as at least one of the one or more UID C-PARAMS 470 from steps 1804 and 1805) then the process ends at step 1808 by returning in the unique identifier response action frame a NULL value, for example, in the unique identifier field.

If a unique identifier 480 is returned (for example, as at least one of the one or more UID C-PARAMS 470 from steps 1804 and 1805), then at step 1807 a unique identifier response action frame is generated that includes the unique identifier 460 retrieved from the unique identifier database 1805 as at least one of the one or more UID C-PARAMS from steps 1804 and 1805. The unique identifier response action frame is sent from the station 105 to the access point 115 and then process ends at step 1808.

Figure 19:
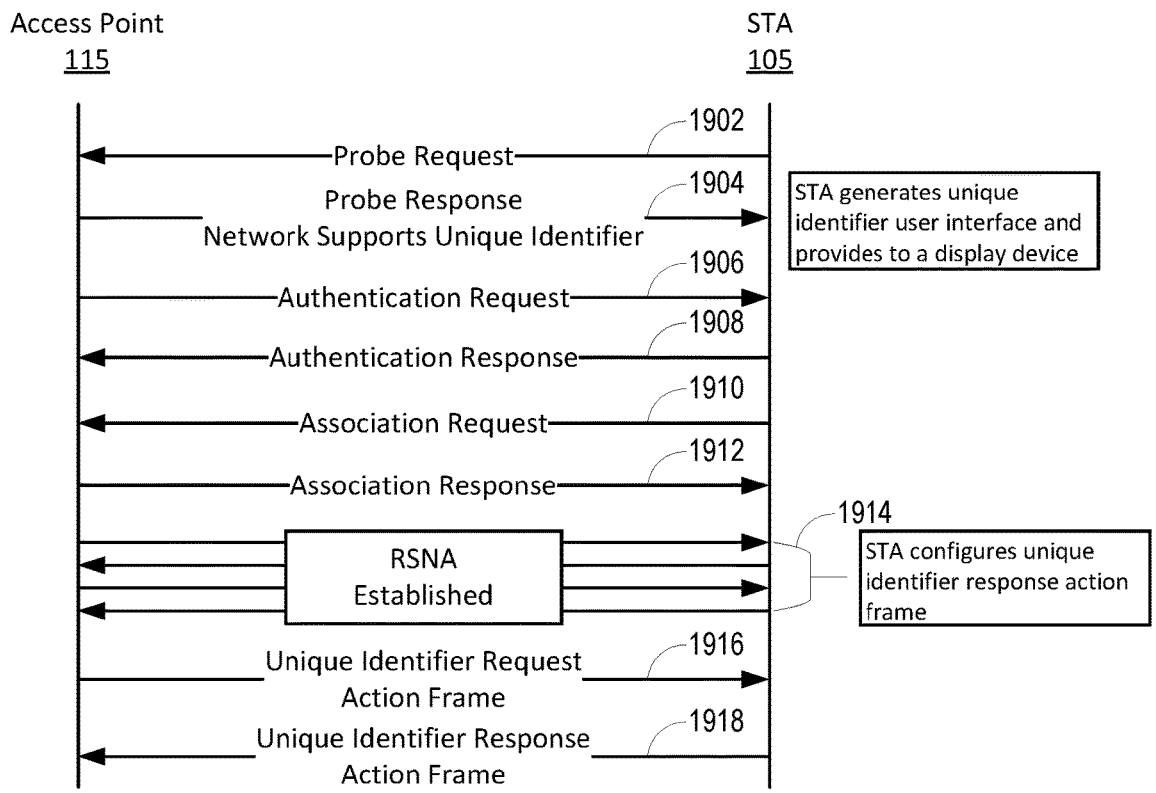
FIG. 19 is a flow diagram illustrating an example of a station providing a unique identifier response action frame to an access point.

FIG. 19 is a flow diagram illustrating an example of a station 105 providing an action frame, for example, a unique identifier response action frame to an access point 115. As an example, a station 105 starts a process operable to generate and provide a unique identifier, for example, the station 105 and the access point 115 can comprise one or more processors, respectively, that execute one or more computer-readable instructions stored in a memory so as to perform one or more steps of FIG. 19. A station 105 can be transitioned within proximity of a network that comprises the access point 115 or otherwise attempts to access a network provided by an access point 115. The station 105 can send a probe request 1902 to the access point 115. In response the access point 115 can send a probe response 1904 to the station 105 that includes information, for example, capabilities information, that indicates that the network supports use of a unique identifier. Upon receiving such information, the station 105 can generate a unique identifier user interface and provide the unique identifier user interface to an I/O device (such as a display device) connected to the station 105.

Continuing the process of establishing a connection to the network, the access point 115 can send an authentication request 1906 to the station 105. The authentication request 1906 can contain information to further authenticate the station 105 to the network. In response, the station 105 can send an authentication response 1908 to the access point 115 that includes authentication information that the station 105 needs to authenticate with the access point 115. The station 105 can then send an association request 1910 to the access point 115. The access point 115 can respond by sending an association response 1912 to the station 105 if the access point 115 determines that the station 105 can join the network, for example, the station 105 has been properly authenticated and supports the basic operational requirements of the network.

A secure connection, for example, a robust secure network association (RSNA) 1914, is established between the access point 115 and the station 105 based on the association between the access point 115 and the station 105 so as to maintain the privacy of the unique identifier that is subsequently used in communications between the station 105 and the access point 115. The access point 115 can send a unique identifier request action frame 1916 to the station 105. The unique identifier request action frame 1916 can indicate that the network supports use of a unique identifier. The station 105 can send a unique identifier response action frame 1918 to the access point 115, for example, based on one or more UID C-PARAMS 470, such as a unique identifier received and/or configured via the unique identifier user interface.

Those skilled in the art will appreciate that the invention improves upon methods and systems for handling unique identifiers for stations. Methods, systems, and computer readable media can be operable to facilitate an exchange of messages between an access point and a station, wherein the access point requests a unique identifier from the station. The station may either respond by sending a message declining to provide a unique identifier or respond by sending a message that comprises a unique identifier to be used by the access point for the station. The response from the station may include additional limitations on the use of the unique identifier by the access point. The access point may enforce different features, such as different policies, against a station depending upon how the station responds to the unique identifier request.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method for generating a unique identifier associated with a station in a network, the method comprising:
    determining that the network supports use of the unique identifier;
    determining a status of a unique identifier setting;
    configuring a unique identifier user interface based on the status and the determination that the network supports use of the unique identifier;
    providing to a display device the unique identifier user interface;
    receiving via the unique identifier user interface one or more unique identifier configuration parameters;
    generating the unique identifier associated with the station based on at least one of the one or more unique identifier configuration parameters; and
    sending a message to the network, wherein the message comprises the unique identifier.

2. The method of claim 1, further comprising:
    establishing a secure connection with an access point of the network; and
    receiving a request from the access point for the unique identifier.

3. The method of claim 2, wherein the request comprises a unique identifier request action frame from the access point.

4. The method of claim 3, further comprising:
storing the one or more unique identifier configuration parameters, wherein the one or more unique identifier configuration parameters comprise the unique identifier and a service set identifier (SSID);
after receiving the request, determining the unique identifier based on the request, wherein the request comprises a network SSID;
generating a unique identifier response action frame based on the unique identifier, wherein sending the message to the network comprises sending the unique identifier response action frame to the access point; and
accessing one or more features of the network based on the unique identifier response action frame.

5. The method of claim 1, further comprising:
wherein the configuring the unique identifier user interface comprises:
retrieving one or more previously stored unique identifier configuration parameters associated with the unique identifier; and
providing to the unique identifier user interface the one or more previously stored unique identifier configuration parameters;
wherein the receiving the one or more unique identifier configuration parameters comprises updating the one or more previously stored unique identifier configuration parameters with the received one or more unique identifier configuration parameters; and
storing the one or more unique identifier configuration parameters.

6. The method of claim 5, further comprising:
determining that the unique identifier has expired based on at least one of the one or more unique identifier configuration parameters;
deleting the one or more unique identifier configuration parameters associated with the unique identifier.

7. The method of claim 1, wherein the one or more unique identifier configuration parameters comprises any of a unique identifier, a service set identifier (SSID), a unique identifier setting, a unique identifier duration, or any combination thereof.

8. A station for generating a unique identifier associated with the station in a network, the station comprising:
a memory storing one or more computer-readable instructions; and
a processor configured to execute the one or more computer-readable instructions to:
determine that the network supports use of the unique identifier;
determine a status of a unique identifier setting;
configure a unique identifier user interface based on the status and the determination that the network supports use of the unique identifier;
provide to a display device the unique identifier user interface;
receive via the unique identifier user interface one or more unique identifier configuration parameters;
generate the unique identifier associated with the station based on at least one of the one or more unique identifier configuration parameters; and
send a message to the network, wherein the message comprises the unique identifier.

9. The station of claim 8, wherein the processor is further configured to execute the one or more computer-readable instructions to:
establish a secure connection with an access point of the network; and
receive a request from the access point for the unique identifier.

10. The station of claim 9, wherein the request comprises a unique identifier request action frame from the access point.

11. The station of claim 10, wherein the processor is further configured to execute the one or more computer-readable instructions to:
store the one or more unique identifier configuration parameters, wherein the one or more unique identifier configuration parameters comprise the unique identifier and a service set identifier (SSID);
after receiving the request, determine the unique identifier based on the request, wherein the request comprises a network SSID;
generate a unique identifier response action frame based on the unique identifier, wherein sending the message to the network comprises sending the unique identifier response action frame to the access point; and
access one or more features of the network based on the unique identifier response action frame.

12. The station of claim 8, wherein:
the configuring the unique identifier user interface comprises:
retrieving one or more previously stored unique identifier configuration parameters associated with the unique identifier; and
providing to the unique identifier user interface the one or more previously stored unique identifier configuration parameters;
the receiving the one or more unique identifier configuration parameters comprises updating the one or more previously stored unique identifier configuration parameters with the received one or more unique identifier configuration parameters; and
the processor is further configured to execute the one or more computer-readable instructions to:
store the one or more unique identifier configuration parameters.

13. The station of claim 12, wherein the processor is further configured to execute the one or more computer-readable instructions to:
determine that the unique identifier has expired based on at least one of the one or more unique identifier configuration parameters;
delete the one or more unique identifier configuration parameters associated with the unique identifier.

14. The station of claim 8, wherein the one or more unique identifier configuration parameters comprises any of a unique identifier, a service set identifier (SSID), a unique identifier setting, a unique identifier duration, or any combination thereof.

15. A non-transitory computer-readable medium of a station storing one or more computer-readable instructions for generating a unique identifier associated with the station in a network, the one or more computer-readable instructions that when executed by a processor of the station cause the station to perform one or more operations comprising:

determining that the network supports use of the unique identifier;
determining a status of a unique identifier setting;
configuring a unique identifier user interface based on the status and the determination that the network supports use of the unique identifier;
providing to a display device the unique identifier user interface;
receiving via the unique identifier user interface one or more unique identifier configuration parameters;
generating the unique identifier associated with the station based on at least one of the one or more unique identifier configuration parameters; and
sending a message to the network, wherein the message comprises the unique identifier.

16. The non-transitory computer-readable medium of claim 15, wherein the one or more computer-readable instructions when executed by the processor further cause the station to perform one or more further operations comprising:
establishing a secure connection with an access point of the network; and
receiving a request from the access point for the unique identifier.

17. The non-transitory computer-readable medium of claim 16, wherein the request comprises a unique identifier request action frame from the access point.

18. The non-transitory computer-readable medium of claim 15, wherein the one or more computer-readable instructions when executed by the processor further cause the station to perform one or more further operations comprising:
storing the one or more unique identifier configuration parameters, wherein the one or more unique identifier configuration parameters comprise the unique identifier and a service set identifier (SSID);
after receiving the request, determining the unique identifier based on the request, wherein the request comprises a network SSID;
generating a unique identifier response action frame based on the unique identifier, wherein sending the message to the network comprises sending the unique identifier response action frame to the access point; and
accessing one or more features of the network based on the unique identifier response action frame.

19. The non-transitory computer-readable medium of claim 18, wherein:
the configuring the unique identifier user interface comprises:
retrieving one or more previously stored unique identifier configuration parameters associated with the unique identifier; and
providing to the unique identifier user interface the one or more previously stored unique identifier configuration parameters;
the receiving the one or more unique identifier configuration parameters comprises updating the one or more previously stored unique identifier configuration parameters with the received one or more unique identifier configuration parameters; and
the one or more computer-readable instructions when executed by the processor further cause the station to perform one or more further operations comprising:
storing the one or more unique identifier configuration parameters.

20. The non-transitory computer-readable medium of claim 8, wherein the one or more computer-readable instructions when executed by the processor further cause the station to perform one or more further operations comprising:
determining that the unique identifier has expired based on at least one of the one or more unique identifier configuration parameters; and
deleting the one or more unique identifier configuration parameters associated with the unique identifier.

* * * * *